(12) United States Patent
Goodson et al.

(10) Patent No.: US 8,156,305 B1
(45) Date of Patent: Apr. 10, 2012

(54) REMAPPING OF DATA ADDRESSES FOR LARGE CAPACITY LOW-LATENCY RANDOM READ MEMORY

(75) Inventors: Garth R. Goodson, Fremont, CA (US);
Rahul N. Iyer, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 861 days.

(21) Appl. No.: 12/243,337

(22) Filed: Oct. 1, 2008

(51) Int. Cl.
*G06F 12/00* (2006.01)

(52) U.S. Cl. ........ 711/202; 711/203; 711/205; 711/206; 711/207; 711/221; 711/E12.014; 711/E12.027; 711/12.029; 711/E12.032; 711/E12.096

(58) Field of Classification Search .................. 711/202, 711/203, 205, 206, 207, 221, E12.014, E12.027, 711/E12.029, E12.032, E12.096
See application file for complete search history.

(56) References Cited

U.S. PATENT DOCUMENTS
2005/0144422 A1* 6/2005 McAlpine et al. ............ 711/206

OTHER PUBLICATIONS

Eran Gal and Sivan Toledo, Algorithms and Data Structures for Flash Memories, ACM Computing Surveys (CSUR) Archive, Jun. 2005, pp. 138-163, vol. 37, Issue 2, Publisher ACM, New York City, NY, USA.

* cited by examiner

*Primary Examiner* — Midys Rojas
(74) *Attorney, Agent, or Firm* — Stattler-Suh PC

(57) ABSTRACT

Described herein are method and apparatus for using an LLRRM device as a storage device in a storage system. At least three levels of data structures may be used to remap storage system addresses to LLRRM addresses for read requests, whereby a first-level data structure is used to locate a second-level data structure corresponding to the storage system address, which is used to locate a third-level data structure corresponding to the storage system address. An LLRRM address may comprise a segment number determined from the second-level data structure and a page number determined from the third-level data structure. Update logs may be produced and stored for each new remapping caused by a write request. An update log may specify a change to be made to a particular data structure. The stored update logs may be performed on the data structures upon the occurrence of a predetermined event.

22 Claims, 13 Drawing Sheets

REMAPPING OF DATA ADDRESSES FOR LARGE CAPACITY LOW-LATENCY RANDOM READ MEMORY

FIELD OF THE INVENTION

The present invention relates to storage systems, and particularly, to remapping of data addresses for large capacity low-latency random read memory.

BACKGROUND OF THE INVENTION

A storage system is a processing system adapted to store and retrieve data on storage devices (such as disks). The storage system includes a storage operating system that implements a file system to logically organize the data as a hierarchical structure of directories and files on the storage devices. Each file may be implemented as a set of blocks configured to store data (such as text), whereas each directory may be implemented as a specially-formatted file in which data about other files and directories are stored. The storage operating system may assign/associate a unique storage system address (e.g., logical block number (LBN)) for each data block stored in the storage system.

The storage operating system generally refers to the computer-executable code operable on a storage system that manages data access and access requests (read or write requests requiring input/output operations) and may implement file system semantics in implementations involving storage systems. In this sense, the Data ONTAP® storage operating system, available from NetApp, Inc. of Sunnyvale, Calif., which implements a Write Anywhere File Layout (WAFL®) file system, is an example of such a storage operating system implemented as a microkernel within an overall protocol stack and associated storage. The storage operating system can also be implemented as an application program operating over a general-purpose operating system, such as UNIX® or Windows®, or as a general-purpose operating system with configurable functionality, which is configured for storage applications as described herein.

A storage system's storage is typically implemented as one or more storage volumes that comprise physical storage devices, defining an overall logical arrangement of storage space. Available storage system implementations can serve a large number of discrete volumes. A storage volume is "loaded" in the storage system by copying the logical organization of the volume's files, data, and directories, into the storage system's memory. Once a volume has been loaded in memory, the volume may be "mounted" by one or more users, applications, devices, and the like, that are permitted to access its contents and navigate its namespace.

A storage system may be configured to allow server systems to access its contents, for example, to read or write data to the storage system. A server system may execute an application that "connects" to the storage system over a computer network, such as a shared local area network (LAN), wide area network (WAN), or virtual private network (VPN) implemented over a public network such as the Internet. The application executing on the server system may send an access request (read or write request) to the storage system for accessing particular data stored on the storage system.

The storage system may typically implement large capacity disk devices for storing large amounts of data. In conjunction with the large capacity disk devices, the storage system may also store data on other storage devices, such as low-latency random read memory (referred to herein as "LLRRM"). When using LLRRM devices in conjunction with disk devices to store data, the storage system may map storage system addresses (e.g., LBNs) to LLRRM addresses to access data on the LLRRM devices. Typically, the storage system implements direct remapping of storage system addresses to LLRRM addresses whereby a single remapping table is used to list storage system addresses and their corresponding LLRRM addresses.

Conventional direct remapping methods are simple in implementation and sufficient for LLRRM devices having relatively small storage capacities. Conventional direct remapping methods, however, become difficult to maintain with LLRRM devices having relatively large storage capacities as the size of the single remapping table (due to the direct mapping nature) become too large to manage efficiently. As such, there is a need for a method and apparatus for remapping addresses on large capacity low-latency random read memory.

SUMMARY OF THE INVENTION

Described herein are method and apparatus for remapping addresses on a large capacity low-latency random read memory (LLRRM) device for using the LLRRM device as a storage device in a storage system. The storage system may store a plurality of data blocks, each data block having an associated unique storage system address (e.g., LBN) in the storage system. In some embodiments, at least three levels of remapping data structures are used to remap storage system addresses to LLRRM addresses for received read requests. In some embodiments, the remapping data structures may be updated based on received write requests using stored remapping update logs. The remapping and update methods may be implemented by a remapping layer that resides in the storage operating system.

In some embodiments, an LLRRM device comprises a non-volatile, rewritable computer memory having lower latency in performing random read requests relative to disk devices. In some embodiments, an LLRRM device comprises a solid state memory device having no mechanical moving parts for reading and writing data. An LLRRM device may be divided into a plurality of segments, where each segment may be divided into a segment header (containing metadata) and a plurality of pages (containing data). Each page in an LLRRM device has an associated LLRRM address that uniquely identifies the storage location of the page in the LLRRM device. In some embodiments, an LLRRM address comprises a segment number and a page number. The remapping layer may receive and process read and write requests to implement the LLRRM device as a storage device in the storage system.

For a read request, the remapping layer may receive a storage system address for requested data and map the storage system address to an LLRRM address using the at least three levels of remapping data structures, whereby the LLRRM address may be used to retrieve the requested data from an LLRRM device. In some embodiments, to map a storage system address to an LLRRM address, a first-level remapping data structure is used to locate a particular second-level remapping data structure (among a plurality of second-level remapping data structures) corresponding to the storage system address, and the second-level remapping data structure is used to locate a particular third-level remapping data structure (among a plurality of third-level remapping data structures) corresponding to the storage system address. In some embodiments, an LLRRM address comprises a segment number determined from the second-level remapping data structure corresponding to the storage system address and a page number determined from the third-level remapping data structure corresponding to the storage system address. A single first-level remapping data structure, a plurality of second-level remapping data structures, and a plurality of third-level remapping data structures may be provided for each LLRRM device.

By providing three levels of remapping data structures, even for large capacity LLRRM devices, each remapping data structure may be kept to a manageable size. In some embodiments, the remapping data structures are stored in an LLRRM device so that the remapping data structures may be retained during a shut down of the storage system. In further embodiments, the remapping data structures may also be loaded/cached into storage system memory (e.g., RAM) for faster access. In some embodiments, by using the multiple levels of remapping data structures, the storage size of the first-level remapping data structure may be kept small enough so it may be completely loaded/cached to memory for faster access.

For a write request, the remapping layer may receive a storage system address and data to be written at the storage system address, store the received data to an LLRRM address in an LLRRM device (thus producing a new remapping from the received storage system address to the LLRRM address where the received data is stored), and update the remapping data structures to reflect the new remapping. In a first stage, for each new remapping, the remapping layer may produce one or more remapping update logs, each remapping update log specifying a change to be made to a particular remapping data structure to reflect the new remapping. The remapping layer then stores the remapping update logs to a non-volatile storage device. In a second stage, the remapping layer may then perform the accumulated stored remapping update logs on the remapping data structures upon the occurrence of a predetermined event (e.g., an active segment becoming finalized or a consistency point). When performing updates to the remapping data structures in two stages, consistency of the updates to the remapping data structures may be enhanced as the remapping update logs are preserved on a non-volatile storage device in case of a storage system "crash."

In some embodiments, methods may be implemented to enhance recoverability or reconstruction of the remapping data structures in case of a restart of the storage system after a shut-down (whether intentional or not). These methods may be used to avoid performing a full scan of all the segments and pages of the LLRRM device to rebuild the remapping data structures (which is time intensive for large capacity LLRRM devices) and provides a faster restart of the storage system. For example, the remapping data structures may be stored to a non-volatile storage device in case of a storage system shut-down.

In some embodiments, the first-level remapping data structure may be stored at a predetermined address on an LLRRM device or a pointer to the first-level remapping data structure may be stored at the predetermined address. Upon restart of the storage system, the remapping layer may be configured to locate the first-level remapping data structure at the predetermined address or use the pointer to locate the first-level remapping data structure. As such, the first-level remapping data structure may be recovered quickly upon restart of the storage system. The second and third-level remapping data structures may then be recovered using the first-level remapping data structure.

In some embodiments, methods may be implemented to enhance reconstruction of the remapping data structures in case the remapping data structures are lost or become corrupted. If the first-level remapping data structure is lost or corrupted, the second-level remapping data structures may be used to reconstruct the first-level remapping data structure. In some embodiments, to reduce the time needed to locate the second-level remapping data structures, the second-level remapping data structures may be stored only to a set of one or more predetermined "remapping" segments in the LLRRM device, a remapping segment being used for storing only remapping data structures.

If both the first-level and the second-level remapping data structures are lost or corrupted, the second-level remapping data structures may be reconstructed using the third-level remapping data structures. The third-level remapping data structures may comprise segment headers. In some embodiments, each segment header of a segment may contain a timestamp (TS) or a version number (VN) that may be updated whenever new data is written to the pages of the segment. In these embodiments, the remapping layer may examine the timestamps or version numbers of two segment headers/third-level remapping data structures that each contain remapping data for the same storage system address. The remapping layer then determines which segment header has the more current/up-to-date remapping data and uses the more up-to-date remapping data from the two segment headers for reconstructing the second-level remapping data structures. The remapping layer may then reconstruct the first-level remapping data structure using the reconstructed second-level remapping data structures.

The remapping layer may be pre-included in storage operating system software or comprise an external auxiliary plug-in type software module that works with the storage operating system to enhance its functions. The remapping layer may operate in conjunction with other software layers of the storage operating system to use the LLRRM device as a storage device in a manner that is transparent to applications submitting access request to the storage system.

BRIEF DESCRIPTION OF THE DRAWINGS

The novel features are set forth in the appended claims. However, for purpose of explanation, several embodiments of the invention are set forth in the following figures.

DETAILED DESCRIPTION

In the following description, numerous details are set forth for purpose of explanation. However, one of ordinary skill in the art will realize that the embodiments described herein may be practiced without the use of these specific details. In other instances, well-known structures and devices are shown in block diagram form in order not to obscure the description with unnecessary detail.

The description that follows is divided into five sections. Section I describes a storage system environment in which some embodiments operate. Section II describes a storage operating system having a remapping layer for using LLRRM as a storage device in a storage system. Section III describes performing read requests using remapping data structures. Section IV describes processing of write requests and updating of the remapping data structures. Section V describes methods for enhancing recoverability and reconstruction of the remapping data structures.

I. Storage System Environment

Figure 1:
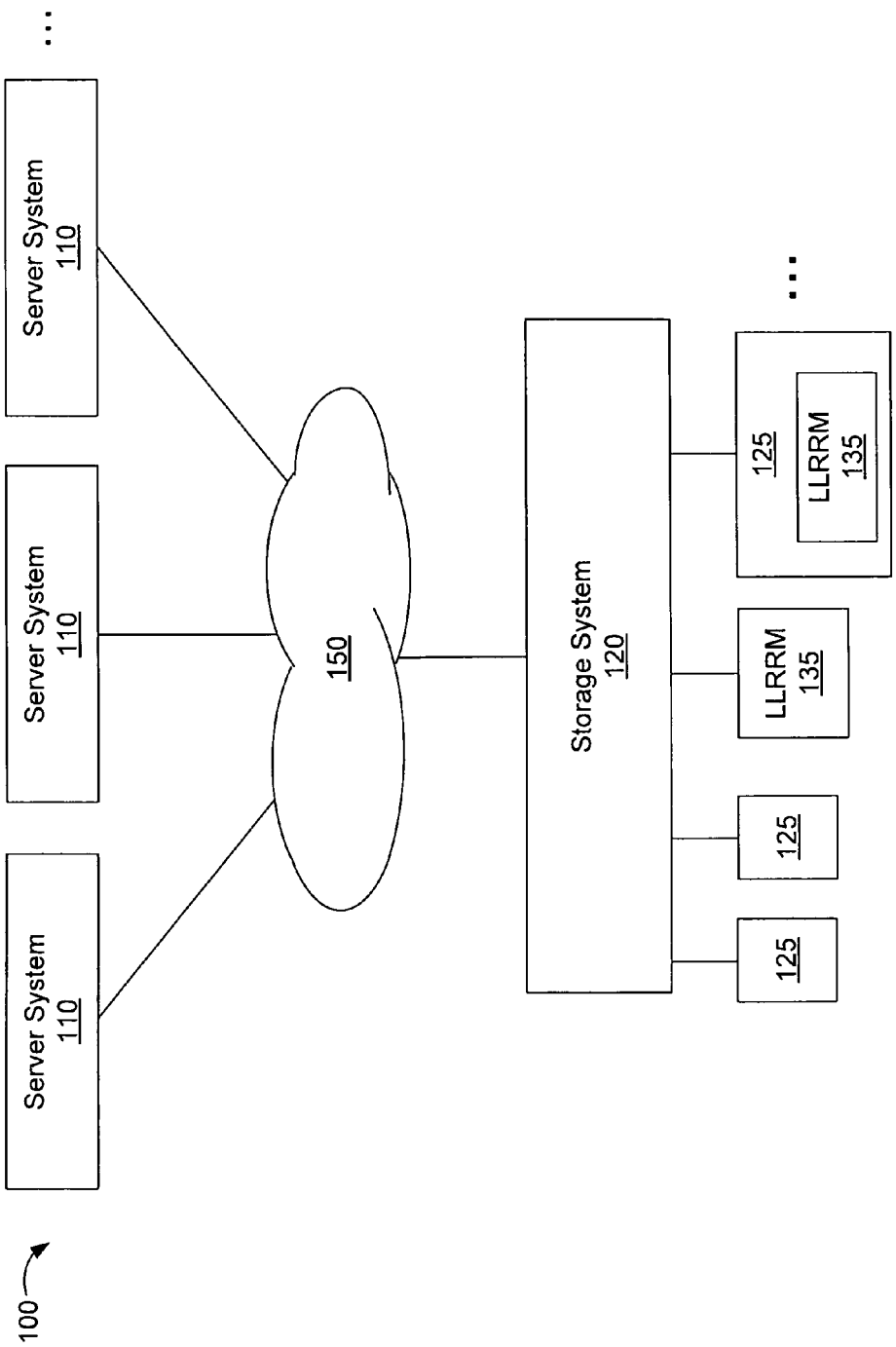
FIG. 1 is a schematic block diagram of an exemplary storage system environment in which some embodiments operate.

FIG. 1 is a schematic block diagram of an exemplary storage system environment 100 in which some embodiments operate. The environment 100 comprises a one or more server systems 110 and a storage system 120 that are connected via a connection system 150. The storage system 120 may comprise a set of storage devices, such as one or more primary storage devices 125 and/or one or more secondary storage devices 135. The connection system 150 may comprise a network, such as a Local Area Network (LAN), Wide Area Network (WAN), metropolitan area network (MAN), the Internet, or any other type of network or communication system between computer systems.

A server system 110 may comprise a computer system that utilizes services of the storage system 120 to store and manage data in the storage devices of the storage system 120. A server system 110 may execute one or more applications that submit access requests for accessing particular data on the storage devices 125 and/or 135 of the storage system 120. Interaction between a server system 110 and the storage system 120 can enable the provision of storage services. That is, server system 110 may request the services of the storage system 120 (e.g., through read or write requests), and the storage system 120 may return the results of the services requested by the server system 110, by exchanging packets over the connection system 150.

The server system 110 may request the services of the storage system by issuing packets using file-based access protocols, such as the Common Internet File System (CIFS) protocol or Network File System (NFS) protocol, over the Transmission Control Protocol/Internet Protocol (TCP/IP) when accessing information in the form of files and directories. Alternatively, the server system 110 may issue packets including block-based access protocols, such as the Fibre Channel Protocol (FCP), or Internet Small Computer System Interface (iSCSI) Storage Area Network (SAN) access, when accessing information in the form of blocks.

The storage system 120 may comprise a computer system that stores data in a set of one or more primary storage devices 125. A primary storage device 125 may comprise a writable storage device media, such as magnetic disks, video tape, optical, DVD, magnetic tape, and any other similar media adapted to store information (including data and parity information). For illustrative purposes, the primary storage device 125 is sometimes described herein as a disk. In some embodiments, the storage system 120 also stores data in a set of one or more secondary storage devices 135, a secondary storage device 135 comprising an LLRRM device. The storage system 120 may use the LLRRM devices 135 in conjunction with the primary storage devices 125 to store data. In other embodiments, the storage system 120 may use only the LLRRM devices 135 to store data without use of the primary storage devices 125.

The LLRRM device may comprise a separate (stand-alone) storage device 135 or may be integrated as part of a primary storage device 125 (such as a hybrid drive comprising an LLRRM and a magnetic storage combined in a single device). As discussed below in relation to FIG. 2, an LLRRM device may also reside in the storage system's internal architecture and be connected with the system bus (e.g., as an LLRRM module on a card). The remapping layer may utilize the LLRRM in a similar manner, regardless of the configuration or location of the LLRRM, so that the LLRRM device(s) 135 and/or primary storage device(s) 125 operate together in a way that is transparent to applications accessing data stored on the storage system 120.

In some embodiments, an LLRRM comprises a non-volatile, rewritable computer memory (i.e., a computer memory that does not require power to maintain information stored in the computer memory and may be electrically erased and reprogrammed) having lower latency in performing random-read requests relative to disk devices. As known in the art, a disk device comprises mechanical moving components for reading and writing data (such as platters and the read/write head). In some embodiments, an LLRRM device comprises a non-volatile rewritable solid state memory device having no mechanical moving parts for reading and writing data. Some examples of LLRRM devices include flash memory, non-volatile random access memory (NVRAM), Magnetic Random Access Memory (MRAM), Phase Change RAM (PRAM), etc. In other embodiments, other LLRRM devices are used other than those listed here.

Although LLRRM may be more costly (for a given amount of data storage) than disk devices, data may be accessed on an LLRRM with higher performance (e.g., lower power consumption and/or lower latency) than on disk devices. In some embodiments, LLRRM 135 may be used as a permanent storage device (alone or in conjunction with primary storage devices 125), rather than as a temporary storage device (e.g., as a cache device). Conventional use of LLRRM as cache devices do not leverage the non-volatile and high reliability characteristics of LLRRM and are typically used to only temporarily store data.

The storage system 120 may implement a file system to logically organize the data as a hierarchical structure of directories and files on each primary and secondary storage device 125 and 135. Each file may be implemented as a set of blocks configured to store data, whereas each directory may be implemented as a specially-formatted file in which information about other files and directories are stored. A block of a file may comprise a fixed-sized amount of data that comprises the smallest amount of storage space that may be accessed (read or written) on a storage device 125. The block may vary widely in data size (e.g., 1 byte, 4-kilobytes (KB), 8 KB, etc.).

The storage operating system may assign/associate a unique storage system address (e.g., logical block number (LBN)) for each data block stored in the storage system. The unique storage system address for a data block may be used by the storage operating system to locate and access (read/write) the data block. In some embodiments, the unique storage system address is referred to as a logical block number (LBN) or a logical block address (LBA). In other embodiments, the storage system address may be expressed in any variety of forms (e.g., logical volume block number, etc.), as long as the storage system address uniquely identifies an address of a data block.

When implementing one or more LLRRM devices 135 for storing data, the storage system 120 may map storage system addresses to LLRRM addresses for locating and accessing data stored on the LLRRM devices 135. The storage system addresses may be used by the file system to locate and access data blocks of the file system, whereas LLRRM addresses may be used by the LLRRM devices 135 to locate and access data blocks stored on the LLRRM devices 135. The LLRRM devices 135 may receive LLRRM addresses and access data on the LLRRM devices 135 by implementing a sub-system for performing various input/output operations (such as reading, writing, or erasing data). The sub-system may comprise a device driver, file system, and/or other software layers for performing the various input/output operations.

Typically, the storage system implements direct remapping of storage system addresses to LLRRM addresses, whereby a single remapping table is used to list storage system addresses and their corresponding LLRRM addresses. Conventional direct remapping methods are simple in implementation and sufficient for LLRRM devices having relatively small storage capacities. Conventional direct remapping methods, however, become difficult to maintain with LLRRM devices having relatively large storage capacities as the size of the single remapping table (due to the direct mapping nature) become too large to manage efficiently. In some embodiments, three levels of remapping data structures are provided for an LLRRM device so that each remapping data structure may be kept to a manageable size.

Figure 2:
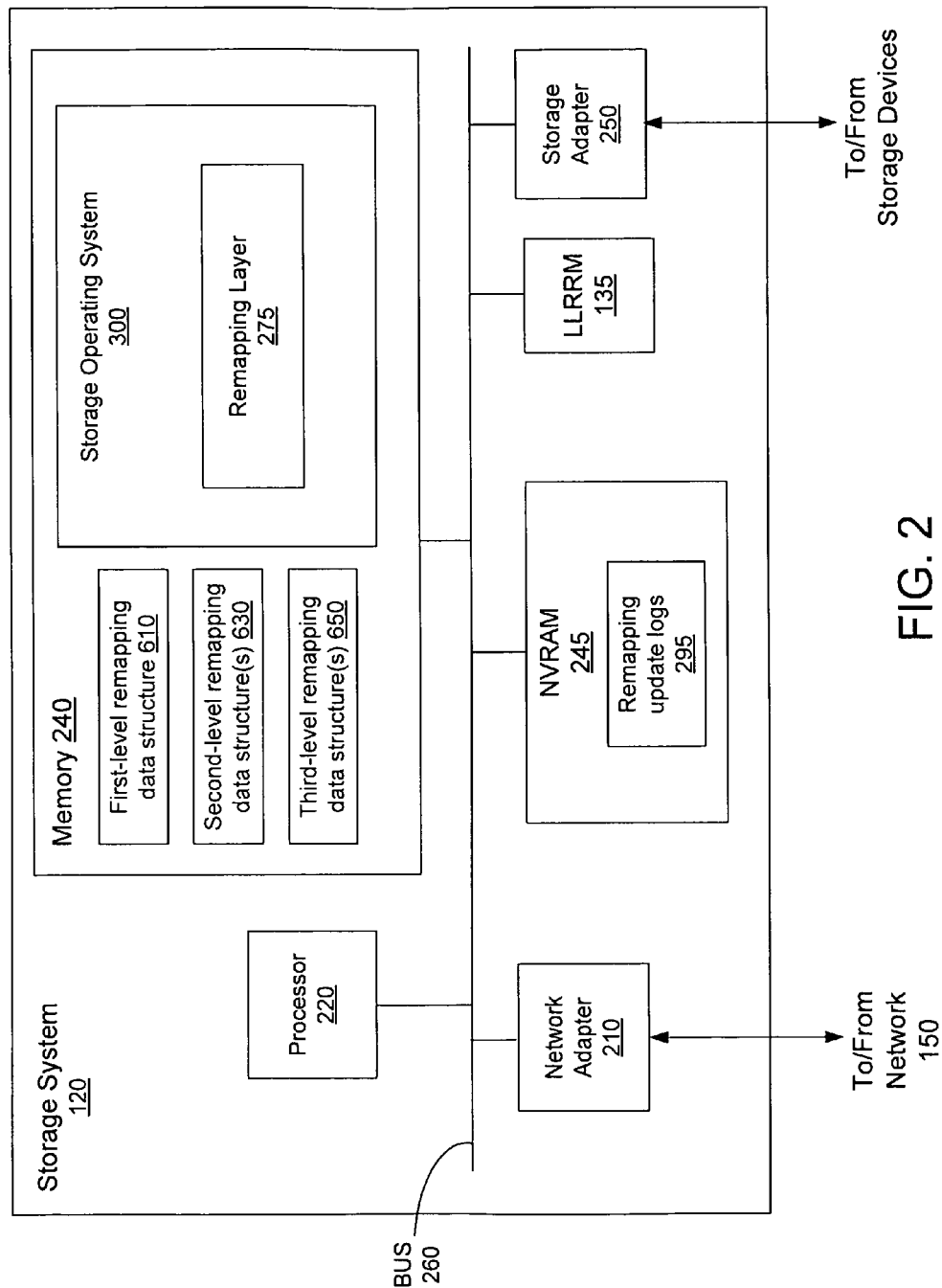
FIG. 2 is a schematic block diagram of an exemplary storage system that may be employed in the storage system environment of FIG. 1.

FIG. 2 is a schematic block diagram of an exemplary storage system 120 that may be employed in the storage system environment of FIG. 1. Those skilled in the art will understand that the embodiments described herein may apply to any type of special-purpose computer (e.g., storage system) or general-purpose computer, including a standalone computer, embodied or not embodied as a storage system. To that end, storage system 120 can be broadly, and alternatively, referred to as a computer system. Moreover, the teachings of the embodiments described herein can be adapted to a variety of storage system architectures including, but not limited to, a network-attached storage environment, a storage area network and disk assembly directly-attached to a server computer. The term "storage system" should, therefore, be taken broadly to include such arrangements.

The storage system 120 comprises a network adapter 210, a processor 220, a memory 240, a non-volatile random access memory (NVRAM) 245, and a storage adapter 250 interconnected by a system bus 260. In some embodiments, the storage system 120 further comprises an LLRRM device 135 that resides in the storage system's internal architecture and is connected with the system bus 260. For example, the LLRRM device 135 may be an LLRRM module on a Peripheral Component Interconnect (PCI) or PCI eXtended (PCI-X) card that is connected with the system bus 260.

The network adapter 210 comprises the mechanical, electrical and signaling circuitry needed to connect the storage system 120 to a server system 110 over a computer network 150. The storage system may include one or more network adapters. Each network adapter 210 has a unique IP address and may provide one or more data access ports for server systems 110 to access the storage system 120 (where the network adapter accepts read/write access requests from the server systems 110 in the form of data packets).

The memory 240 comprises storage locations that are addressable by the processor 220 and adapters for storing software program code and data. The memory 240 may comprise a form of random access memory (RAM) that is generally cleared by a power cycle or other reboot operation (e.g., it is a "volatile" memory). In other embodiments, however, the memory 240 may comprise a non-volatile form of memory that does not require power to maintain information. The processor 220 and adapters may, in turn, comprise processing elements and/or logic circuitry configured to execute the software code and manipulate the data stored in the memory 240.

The storage system 120 may also include a NVRAM 245 that may be employed as a backup memory that ensures that the storage system 120 does not "lose" received information, e.g., CIFS and NFS requests, in the event of a system shutdown or other unforeseen problem. The NVRAM 245 is typically a large-volume solid-state memory array (RAM) having either a back-up battery, or other built-in last-state-retention capabilities (e.g. an LLRRM), that holds the last state of the memory in the event of any power loss to the array. Therefore, even if an access request stored in memory 240 is lost or erased (e.g., due to a temporary power outage) it still may be recovered from the NVRAM 245. In other embodiments, in place of NVRAM 245, the storage system 120 may include any other type of non-volatile memory (such as flash memory, Magnetic Random Access Memory (MRAM), Phase Change RAM (PRAM), etc.).

The processor 220 executes a storage operating system application 300 of the storage system 120 that functionally organizes the storage system by, inter alia, invoking storage operations in support of a file service implemented by the storage system. In some embodiments, the storage operating system 300 comprises a plurality of software layers (including a remapping layer 275) that are executed by the processor 220. In some embodiments, the remapping layer 275 is implemented to remap storage system addresses to LLRRM addresses to use an LLRRM device as a storage device 135, without requiring code modification of the other layers of the storage operating system 300. Portions of the storage operating system 300 are typically resident in memory 240. It will be apparent to those skilled in the art, however, that other processing and memory means, including various computer readable media, may be used for storing and executing program instructions pertaining to the storage operating system 300.

The storage adapter 250 cooperates with the storage operating system 300 executing on the storage system 120 to access data requested by the server system 110. The data may be stored on the storage devices 125 and 135 that are attached, via the storage adapter 250, to the storage system 120 or other node of a storage system as defined herein. The storage adapter 250 includes input/output (I/O) interface circuitry that couples to the storage devices 125 and 135 over an I/O interconnect arrangement, such as a conventional high-performance, Fibre Channel serial link topology. In response to an access request received from a server system 110, data may be retrieved by the storage adapter 250 and, if necessary, processed by the processor 220 (or the adapter 250 itself) prior to being forwarded over the system bus 260 to the network adapter 210, where the data is formatted into a packet and returned to the server system 110.

In an illustrative embodiment, the primary storage devices 125 may comprise disks that are arranged into a plurality of volumes, each having a file system associated therewith. In one embodiment, the storage devices 125 comprise disks that are configured into a plurality of RAID (redundant array of independent disks) groups whereby multiple primary storage devices 125 are combined into a single logical unit (i.e., RAID group). In a typical RAID group, primary storage devices 125 of the group share or replicate data among the disks which may increase data reliability or performance. The primary storage devices 125 of a RAID group are configured so that some disks store striped data and at least one disk stores separate parity for the data, in accordance with a preferred RAID-4 configuration. However, other configurations (e.g. RAID-5 having distributed parity across stripes, RAID-DP, etc.) are also contemplated. A single volume typically comprises a plurality of primary storage devices 125 and may be embodied as a plurality of RAID groups.

The organization of a storage operating system 300 for the exemplary storage system 120 is now described briefly. However, it is expressly contemplated that the principles of the embodiments described herein can be implemented using a variety of alternative storage operating system architectures. As discussed above, the term "storage operating system" as used herein with respect to a storage system generally refers to the computer-executable code operable on a storage system and manages data access. In this sense, Data ONTAP® software is an example of such a storage operating system implemented as a microkernel. The storage operating system can also be implemented as an application program operating over a general-purpose operating system, such as UNIX® or Windows®, or as a general-purpose operating system with configurable functionality.

Figure 3:
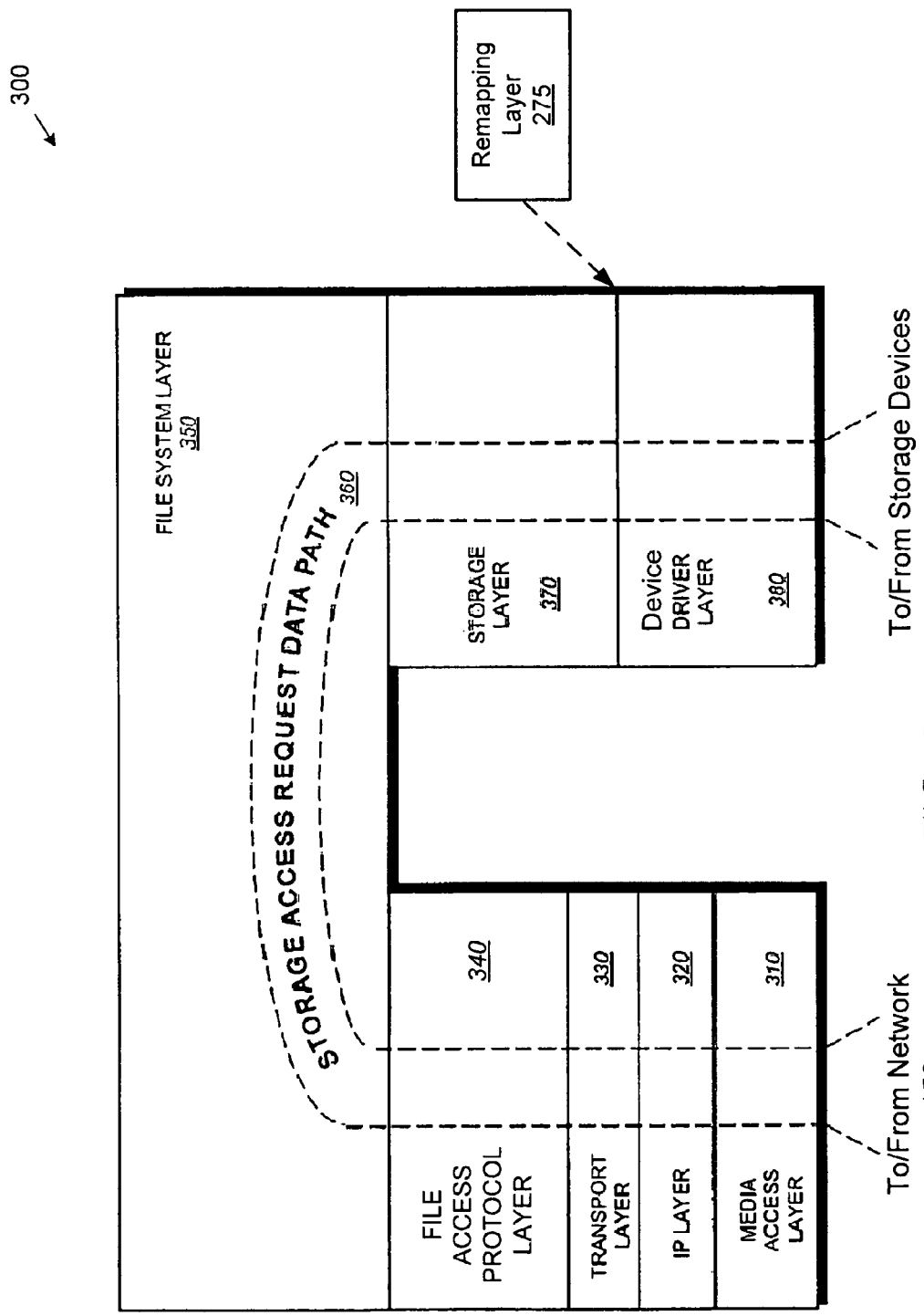
FIG. 3 is a schematic block diagram of an exemplary storage operating system that may be implemented by the storage system in FIG. 2.

As shown in FIG. 3, the storage operating system 300 comprises a series of software layers that form an integrated protocol software stack. The protocol stack provides data paths 360 for server systems 110 to access data stored on the storage system 120 using file-access protocols. The protocol stack includes a media access layer 310 of network drivers (e.g., an Ethernet driver). The media access layer 310 interfaces with network communication and protocol layers, such as the Internet Protocol (IP) layer 320 and the transport layer 330 (e.g., TCP/UDP protocol). The IP layer 320 may be used to provide one or more data access ports for server systems 110 to access the storage system 120. In some embodiments, the IP layer 320 layer provides a dedicated private port for each of one or more remote-file access protocols implemented by the storage system 120.

A file-access protocol layer 340 provides multi-protocol data access and, for example, may include support for the Hypertext Transfer Protocol (HTTP) protocol, the NFS protocol, and the CIFS protocol. The storage operating system 300 may include support for other protocols, including, but not limited to, the direct access file system (DAFS) protocol, the web-based distributed authoring and versioning (WebDAV) protocol, the Internet small computer system interface (iSCSI) protocol, and so forth. The storage operating system 300 may manage the primary storage devices 125 using a storage layer 370 that implements a storage protocol (such as a RAID protocol) and a device driver layer 380 that implements a device control protocol (such as small computer system interface (SCSI), integrated drive electronics (IDE), etc.).

Bridging the storage device software layers with the network and file-system protocol layers is a file system layer 350 of the storage operating system 300. In an illustrative embodiment, the file system layer 350 implements a file system having an on-disk format representation that is block-based using, for example, 4 KB data blocks. For each data block, the file system layer 350 may assign/associate a unique storage system address (e.g., a unique LBN) for storing data blocks in the set of storage devices. The file system layer 350 also assigns, for each file, a unique inode number and an associated inode. An inode may comprise a data structure used to store information about a file, such as ownership of the file, access permission for the file, size of the file, name of the file, location of the file, etc. Each inode may also contain information regarding the block locations of the file. In some embodiments, the block locations are indicated by LBNs assigned for each block of the file.

In response to receiving a file-access request, the file system generates operations to load (retrieve) the requested data from the storage devices. If the information is not resident in the storage system's memory 240, the file system layer 350 indexes into an inode using the received inode number to access an appropriate entry and retrieve a storage system address (e.g., LBN). The storage system address may then used by the file system layer 350, storage layer 370, and an appropriate driver of the device driver layer 380 to access the requested storage system address from the storage devices. The requested data may then be loaded in memory 240 for processing by the storage system 120. Upon successful completion of the request, the storage system (and storage operating system) returns a response, e.g., a conventional acknowledgement packet defined by the CIFS specification, to the server system 110 over the network 150.

It should be noted that the software "path" 360 through the storage operating system layers described above needed to perform data storage access for the requests received at the storage system may alternatively be implemented in hardware or a combination of hardware and software. That is, in an alternative embodiment, the storage access request path 360 may be implemented as logic circuitry embodied within a field programmable gate array (FPGA) or an application specific integrated circuit (ASIC). This type of hardware implementation may increase the performance of the file service provided by storage system 120 in response to a file system request packet issued by server system 110. Moreover, in a further embodiment, the processing elements of network and storage adapters 210 and 250 may be configured to offload some or all of the packet processing and storage access operations, respectively, from processor 220 to thereby increase the performance of the data access service provided by the storage system.

II. Remapping Layer for LLRRM Devices

A. Remapping Layer Overview

When using LLRRM devices 135 as storage devices, the storage operating system 300 may further implement a remapping layer 275 that maps/translates storage system addresses to LLRRM addresses. In some embodiments, the remapping layer 275 operates in conjunction with the other software layers and file system of the storage operating system 300 to use an LLRRM device 135 as a storage device in the storage system 120. In some embodiments, the remapping layer 275 may be pre-included in storage operating system 300 software. In other embodiments, the remapping layer 275 may comprise an external auxiliary plug-in type software module that works with the storage operating system 300 to enhance its functions. In these embodiments, the remapping layer 275 software module may be installed onto a present storage operating system 300 without otherwise requiring code modification of the storage operating system 300. As such, the remapping layer 275 may be imposed upon any existing storage operating system 300 and file system to use an LLRRM device 135 as a storage device.

Figure 4:
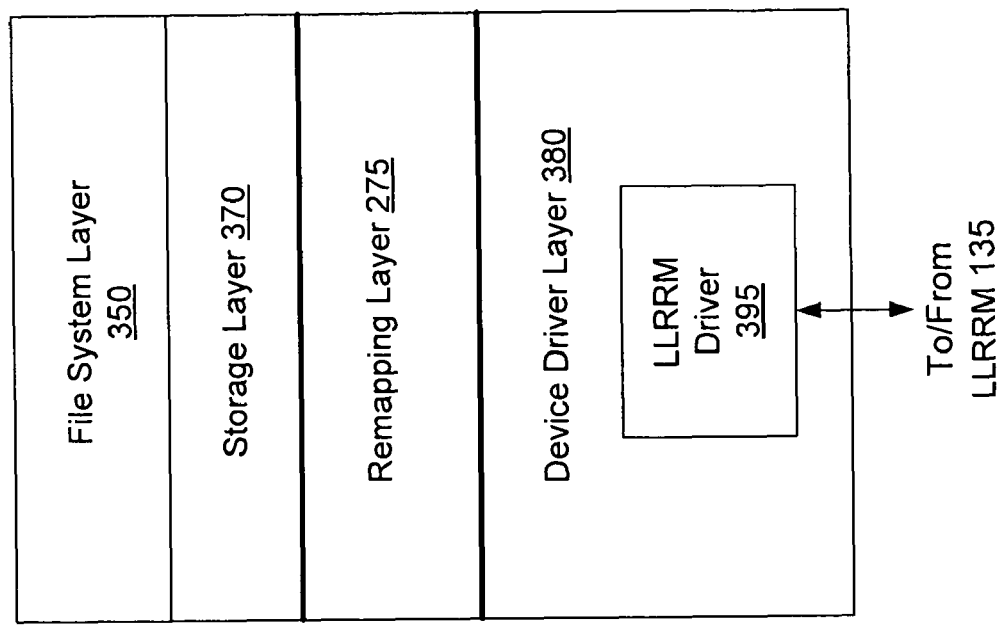
FIG. 4 shows a conceptual diagram where the remapping layer within the storage operating system.

The remapping layer 275 may reside between various software layers of the storage operating system 300. FIG. 4 shows a conceptual diagram of an example where the remapping layer 275 resides between the storage layer 370 and the device driver layer 380 of the storage operating system 300. In other embodiments, the remapping layer 275 resides between other software layers of the storage operating system 300. In some embodiments, the remapping layer 275 and/or device driver layer 380 may reside on the LLRRM device 135.

The device driver layer 380 may be used to help perform the functions of the remapping layer 275. The device driver layer 380 may receive commands (e.g., read page, write page, erase block), LLRRM addresses, data size, and any data blocks to be written at the LLRRM addresses from the remapping layer 275. The device driver layer 380 may use the LLRRM addresses to locate and access particular storage locations on an LLRRM device 135 and perform the received commands. The device driver layer 380 may comprise different device drivers for different devices. When using LLRRM devices 135 as storage devices, the device driver layer 380 may comprise an LLRRM driver 395 configured for accessing requested storage locations on the LLRRM devices 135. For read commands, the device driver layer 380 accesses the appropriate data on the LLRRM devices 135 and loads requested data in memory 240 for processing by the storage system 120. Upon successful completion of the request, the storage operating system returns a response to the server system 110 over the network 150.

In the example of FIG. 4, the remapping layer 275 may receive as input access-request information regarding a read or write request from the storage layer 370. The access-request information may include, for example, a request descriptor (e.g., read or write), a storage system address (e.g., LBN), and data size. The storage system address may specify a data block that is the starting point from which data is to be read or written. The data size may specify the amount of data to be read or written starting from the storage system address. For write requests, the remapping layer 275 may also receive as input from the storage layer 370 the data to be written at the storage system address.

In general, for a received read request, the remapping layer 275 may receive as input (from the storage layer 370) storage system addresses, remap the storage system addresses to LLRRM addresses using the remapping data structures, and output the LLRRM addresses to the device driver layer 380 for retrieval of the requested data. In general, for a received write request, the remapping layer 275 may receive as input (from the storage layer 370) storage system addresses and data blocks to be written, store the data blocks to LLRRM addresses in an LLRRM device 135, and update the remapping data structures to reflect the storing of the data blocks to the LLRRM addresses.

B. Overview of LLRRM Devices

Before discussing processing of read and write requests by the remapping layer 275, a brief overview of the storage architecture of LLRRM devices 135 is provided. In the embodiments below, the description and terms (e.g., "segment," "page," etc.) commonly applied to flash memory devices may be used. The description and terms used below, however, should not be narrowly construed to apply only to flash memory devices. As such, the below embodiments may be applied to any LLRRM device.

Figure 5:
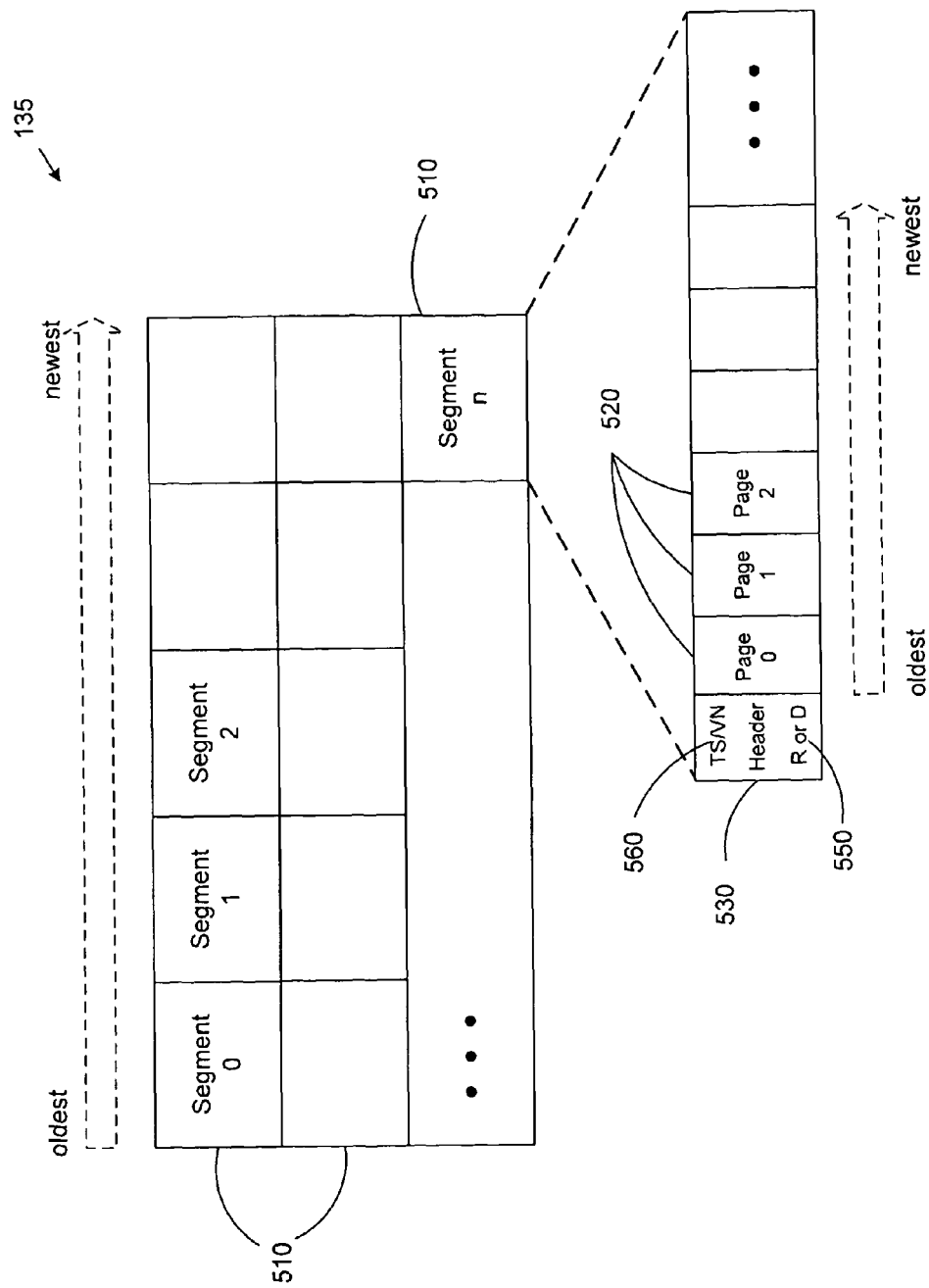
FIG. 5 shows a conceptual diagram of the storage architecture of an LLRRM device.

FIG. 5 shows a conceptual diagram of the storage architecture of a generic LLRRM device 135. As shown in the example of FIG. 5, the storage space of the LLRRM device 135 may be partitioned/divided into a plurality of segments 510. The storage space of each segment 510 may also be partitioned/divided into a plurality of pages 520. Although the terms "segment" and "page" are used in some embodiments, these terms should not be construed narrowly. In general, as used herein, a "segment" may indicate a sub-portion of the storage space of an LLRRM device 135, and a "page" may indicate a sub-portion of the storage space of a segment 510.

Each page 520 of a segment 510 may be configured for storing a predetermined amount of data (e.g., a 4 KB data block). A page may comprise a fixed-sized amount of data that comprises the smallest amount of storage space that may be accessed (read or written) on an LLRRM device 135. Each page 520 in an LLRRM device 135 has an associated LLRRM address that uniquely identifies the storage location of the page 520 in the LLRRM device 135. The LLRRM address of a page may be expressed in different forms. For example, an LLRRM address may comprise a segment number and a page offset number (e.g., segment 2, page offset 3) that uniquely identifies the location of a page 520. As a further example, an LLRRM address may comprise an absolute page number (e.g., page number 235) that uniquely identifies a page offset location from the beginning of the LLRRM device 135 (e.g., where each page is numbered from first page 0 and incrementing to the last page n in the LLRRM device 135). In other embodiments, LLRRM addresses are expressed in a different form than those listed here.

Each segment 510 may also contain a segment header 530 for storing metadata describing the data stored in the pages 520 of the segment 510. Such metadata may include address remapping data for each page 520 in the segment 510 for mapping a specific storage system address to a specific LLRRM address. As discussed below, in some embodiments, the address remapping data of a segment header 530 may comprise a third-level remapping data structure.

In some embodiments, data is written/stored to the LLRRM device 135 using a log-based storage scheme. In the log-based storage scheme, the LLRRM device 135 is treated as a log buffer and new data is written in chronological order to the next available segment 510 in the next available page 520 in the LLRRM device 135. When the end of the LLRRM device 135 is reached, data is stored from the beginning of the LLRRM device 135 again. As shown in the example of FIG. 5, data may be written starting from the first segment 510 or page 520 to the last segment 510 or page 520, the oldest data being stored to the beginning segments 510 or page 520 and the newest data being stored to the later segments 510 or pages 520. There is typically only one segment (referred to as the "active segment") that is being written to any one time. After the active segment is "finalized" (i.e., after new data is written to the last available page of the active segment), writing begins on a selected new active segment. In other embodiments, data is written to the LLRRM device 135 using a different storage scheme other than log-based.

III. Performing Read Requests Using the Remapping Data Structures

As discussed above, each page 520 in an LLRRM device 135 has an associated LLRRM address that uniquely identifies the storage location of the page 520 in the LLRRM device 135. In some embodiments, for a received read request specifying a storage system address, the remapping layer 275 may use at least three levels of remapping data structures to map the storage system address to an LLRRM address where the requested data is stored.

Figure 6:
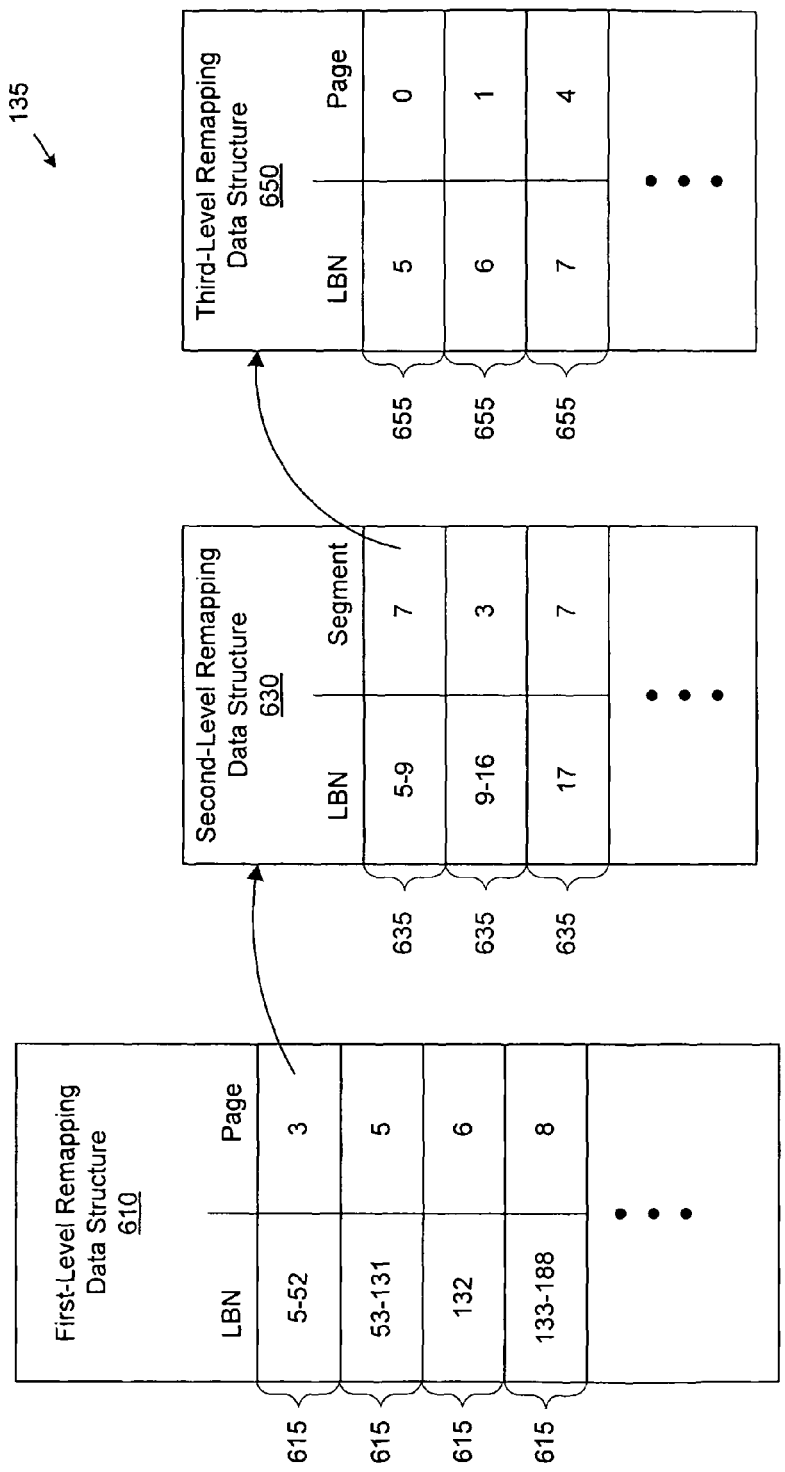
FIG. 6 shows a conceptual diagram of examples of three levels of remapping data structures used to map a storage system address to an LLRRM address.

FIG. 6 shows a conceptual diagram of examples of three levels of remapping data structures used to map a storage system address to an LLRRM address. As shown in FIG. 6, the at least three levels of remapping data structures include a first-level remapping data structure 610, a second-level remapping data structure 630, and a third-level remapping data structure 650. In some embodiments, a single first-level remapping data structure 610, a plurality of second-level remapping data structures 630, and a plurality of third-level remapping data structures 650 are provided for a single LLRRM device 135. As used herein, a remapping data structure may comprise any container or object for organizing and storing remapping data (such as a table, file, etc.).

In some embodiments, the remapping data structures are stored in an LLRRM device 135. In further embodiments, the remapping data structures may also be loaded/cached in memory 240 for faster access (as shown in FIG. 2). In additional embodiments, a remapping data structure may be pageable whereby portions of the remapping data structure may be cached in memory 240. In some embodiments, the size of the first-level remapping data structure 610 is kept small enough in storage size so it may be completely loaded/cached to memory 240. The size of the first-level remapping data structure 610 may be kept small by implementing the multiple levels of remapping data structures.

In some embodiments, to map a storage system address to an LLRRM address, a first-level remapping data structure is used to locate a particular second-level remapping data structure 630 (among a plurality of second-level remapping data structures 630) corresponding to the storage system address, and the second-level remapping data structure 630 is used to locate a particular third-level remapping data structure 650 (among a plurality of third-level remapping data structures 650) corresponding to the storage system address, the LLRRM address comprising a segment number determined from the second-level remapping data structure 630 corresponding to the storage system address and a page number determined from the third-level remapping data structure 650 corresponding to the storage system address. As used in the below description and figures, a storage system address may be represented by "LBN," but in other embodiments, a storage system address may be represented in a different form. Likewise, an LLRRM address may be represented by "Page" and/or "Segment" but in other embodiments, an LLRRM address may be represented in a different form.

The first-level remapping data structure 610 comprises a plurality of remapping entries 615, each remapping entry 615 comprising an LBN range or number field and a second-level locater field (for locating a second-level remapping data structure 630). In some embodiments, the entries 615 are ordered according to LBN range or number values (e.g., ordered in incrementing LBN values). In some embodiments, the second-level locater field comprises a page number field. The page number field may indicate an address location on an LLRRM device 135 where a second-level remapping data structure 630 for the corresponding LBN range or number is stored. The page number may comprise an absolute page number. In other embodiments, a segment number and a page offset number may be used instead. In some embodiments, the page number may comprise a pointer or reference to the corresponding second-level remapping data structure 630.

The second-level remapping data structure 630 comprises a plurality of remapping entries 635, each remapping entry 635 comprising an LBN range or number field and a third-level locater field (for locating a third-level remapping data structure 650). In some embodiments, the entries 635 are ordered according to LBN range or number values (e.g., ordered in incrementing LBN values). For each remapping entry 635, the third-level locater field may indicate the location on an LLRRM device 135 where a third-level remapping data structure 650 for the corresponding LBN range is stored.

In some embodiments, the third-level locater field may comprise a segment number field. The segment number field may comprise a pointer or reference to the corresponding third-level remapping data structure 650. In some embodiments, the third-level remapping data structure 650 comprises the address remapping data of a segment header. In these embodiments, the segment number may indicate the segment that contains a segment header that comprises the third-level remapping data structure 650 for the corresponding LBN range. As such, the segment number may also indicate the segment in the LLRRM device 135 that contains the requested data for the received storage system address, whereby the precise page number in the segment containing the requested data may be determined using the third-level remapping data structure 650.

The third-level remapping data structure 650 comprises a plurality of remapping entries 655, each remapping entry 655 comprising an LBN number field and a page number field. In some embodiments, the entries 655 are ordered according to LBN number values (e.g., ordered in incrementing LBN values). For each remapping entry 655, the page number may indicate the precise page location in the segment where the requested data for the corresponding LBN number is stored.

Figure 7:
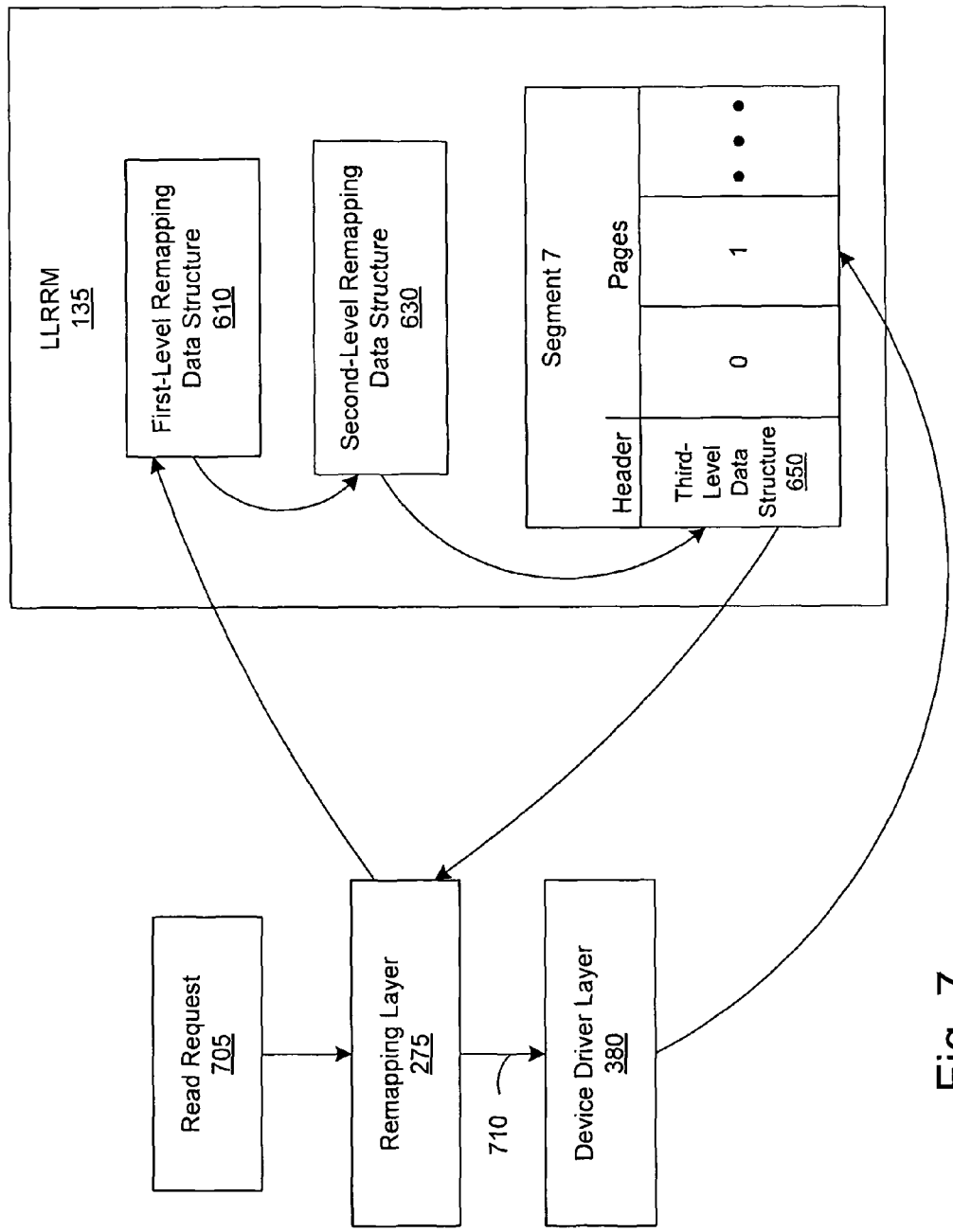
FIG. 7 shows a conceptual diagram of the processing of received read requests by the remapping layer.

FIG. 7 shows a conceptual diagram of the processing of received read requests by the remapping layer 275. The remapping layer 275 may receive (e.g., from the storage layer 370) a read request 705 specifying a storage system addresses for retrieving data (referred to as the requested data). The remapping layer 275 may determine an entry 615 (referred to as the first matching entry) in the first-level remapping data structure 610 having an LBN range or number that contains or matches the received storage system address. The remapping layer 275 may then use the second-level locater (e.g., page number) in the first matching entry to locate the particular second-level remapping data structure 630 that corresponds to the first matching entry and the received storage system address.

The remapping layer 275 may then determine a matching entry 635 (referred to as the second matching entry) in the second-level remapping data structure 630 having an LBN range or number that contains or matches the received storage system address. Note that each LBN range of a remapping entry 635 in the second-level remapping data structure 630 comprises a sub-range of the LBN range of the first matching entry in the first-level remapping data structure 610. The remapping layer 275 then uses the third-level locater (e.g., segment number) in the second matching entry to locate the particular third-level remapping data structure 650 that corresponds to the second matching entry and the received storage system address.

The remapping layer 275 may then determine a matching entry 655 (referred to as the third matching entry) in the third-level remapping data structure 650 having an LBN number that matches the received storage system address and determine the page number in the third matching entry. Note that each LBN number of a remapping entry 655 in the third-level remapping data structure 650 comprises a number in the LBN range of the second matching entry in the second-level remapping data structure 630.

As such, for a received read request 705 specifying a storage system addresses, the remapping layer 275 may remap the storage system address to an LLRRM address using the three remapping data structures 610, 630, and 650. In some embodiments, to map a storage system address to an LLRRM address, a first-level remapping data structure is used to locate a second-level remapping data structure 630, and the second-level remapping data structure 630 is used to locate a third-level remapping data structure 650. In some embodiments, an LLRRM address comprises a segment number and a page number, the segment number being determined from the second-level remapping data structure 630 (from a third-level locator field in the second matching entry 635) and the page number being determined from the third-level remapping data structure 650 (from a page number field in the third matching entry 655). The remapping layer 275 may then send a read command 710 to the device driver layer 380, the read command 710 specifying a read operation at the determined LLRRM address.

The following is an example of the processing of a received read request by the remapping layer 275 that refers to FIGS. 6 and 7. For example, the read request 705 may request data at storage system address "LBN 6." As shown in the example of FIG. 6, the remapping layer 275 may determine a first matching entry in the first-level remapping data structure 610 having the LBN range "5-52" that contains the storage system address. The page number "3" in the first matching entry is then used to locate the second-level remapping data structure 630 corresponding to the first matching entry and the received storage system address. The remapping layer 275 then determines a second matching entry in the second-level remapping data structure 630 having an LBN range "5-9" that contains the received storage system address. The segment number "7" in the second matching entry is then used to locate the third-level remapping data structure 650 corresponding to the second matching entry and the received storage system address. The third-level remapping data structure 650 may comprise the address remapping data of the segment header of segment number "7." The remapping layer 275 may then determine a third matching entry in the third-level remapping data structure 650 having LBN number "6" that matches the received storage system address and determine page number "1" in the third matching entry.

As such, the storage system address "LBN 6" has been remapped to an LLRRM address comprising segment number "7" and page number "1," the segment number being determined from the second-level remapping data structure 630 and the page number being determined from the third-level remapping data structure 650. The remapping layer 275 then sends a read command 710 to the device driver layer 380, the read command 710 specifying a read operation at the determined LLRRM address. The device driver layer 380 then retrieves data at segment number "7" and page number "1" on the LLRRM device 135.

Figure 8:
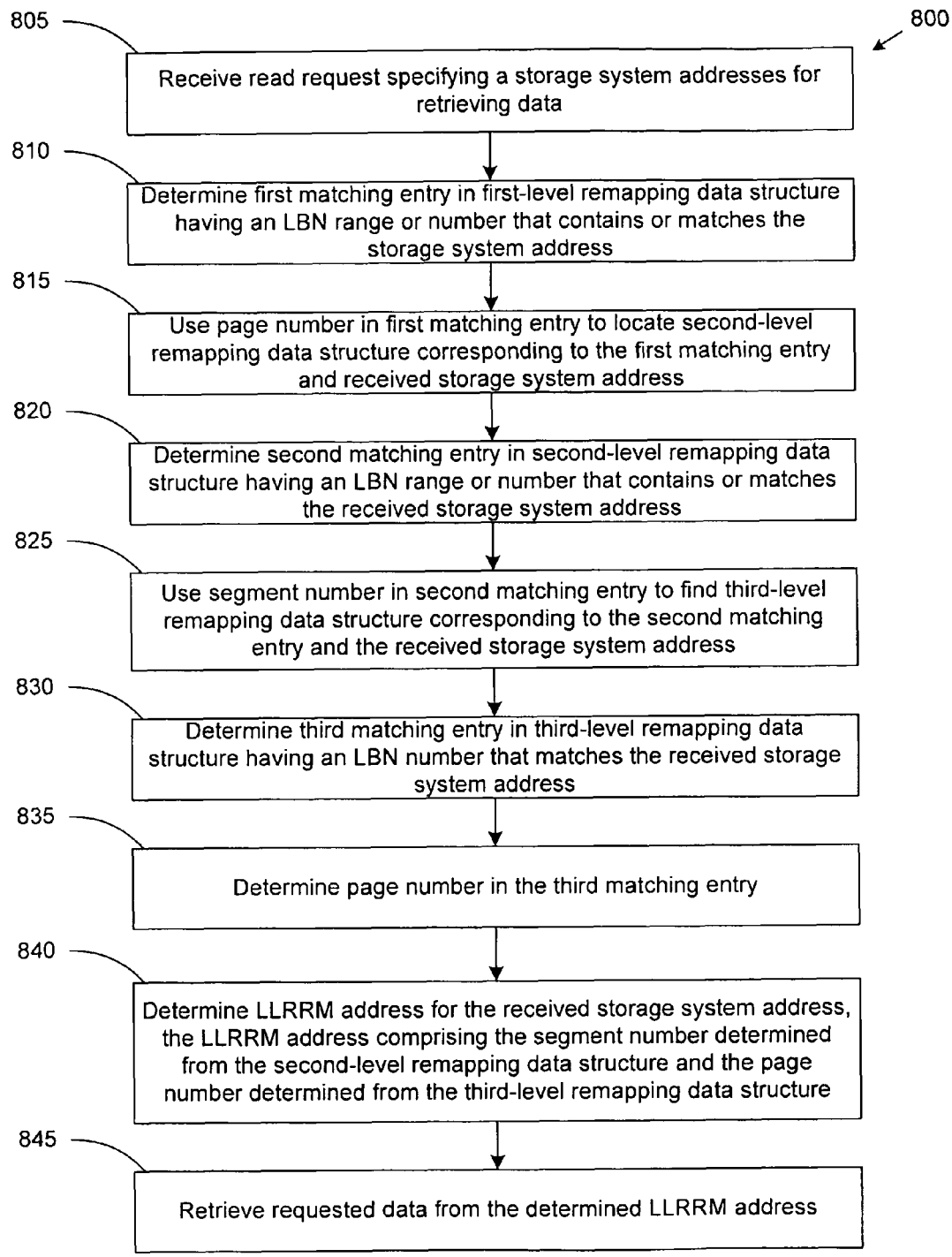
FIG. 8 is a flowchart of a method for performing read requests using the remapping data structures.

FIG. 8 is a flowchart of a method 800 for performing read requests using the remapping data structures. In some embodiments, some of the steps of the method 800 are implemented by software or hardware. In some embodiments, some of the steps of method 800 are performed by the remapping layer 275 in conjunction with the device driver layer 380. The order and number of steps of the method 800 are for illustrative purposes only and, in other embodiments, a different order and/or number of steps are used.

The method 800 begins when a read request 705 is received (at step 805), the read request specifying a storage system addresses for retrieving particular data (referred to as the requested data). The method 800 may determine (at step 810) a first matching entry 615 in the first-level remapping data structure 610 having an LBN range or number that contains or matches the storage system address. The method 800 then uses (at step 815) the second-level locator/page number in the first matching entry to locate the second-level remapping data structure 630 corresponding to the first matching entry and the received storage system address.

The method 800 then determines (at step 820) a second matching entry 635 in the second-level remapping data structure 630 having an LBN range or number that contains or matches the received storage system address. The method 800 then uses (at step 825) the third-level locator/segment number in the second matching entry to locate the third-level remapping data structure 650 corresponding to the second matching entry and the received storage system address. The method 800 then determines (at step 830) a third matching entry 655 in the third-level remapping data structure 650 having an LBN number that matches the received storage system address. The method determines (at step 835) the page number in the third matching entry.

The method then determines (at step 840) the LLRRM address for the received storage system address, the LLRRM address comprising the segment number determined from the second-level remapping data structure 630 and the page number determined from the third-level remapping data structure 650. The method 800 then retrieves (at step 845) the requested data from the determined LLRRM address. The method 800 may be repeated for each received read request 705.

IV. Write Requests and Updating the Remapping Data Structures

Figure 9:
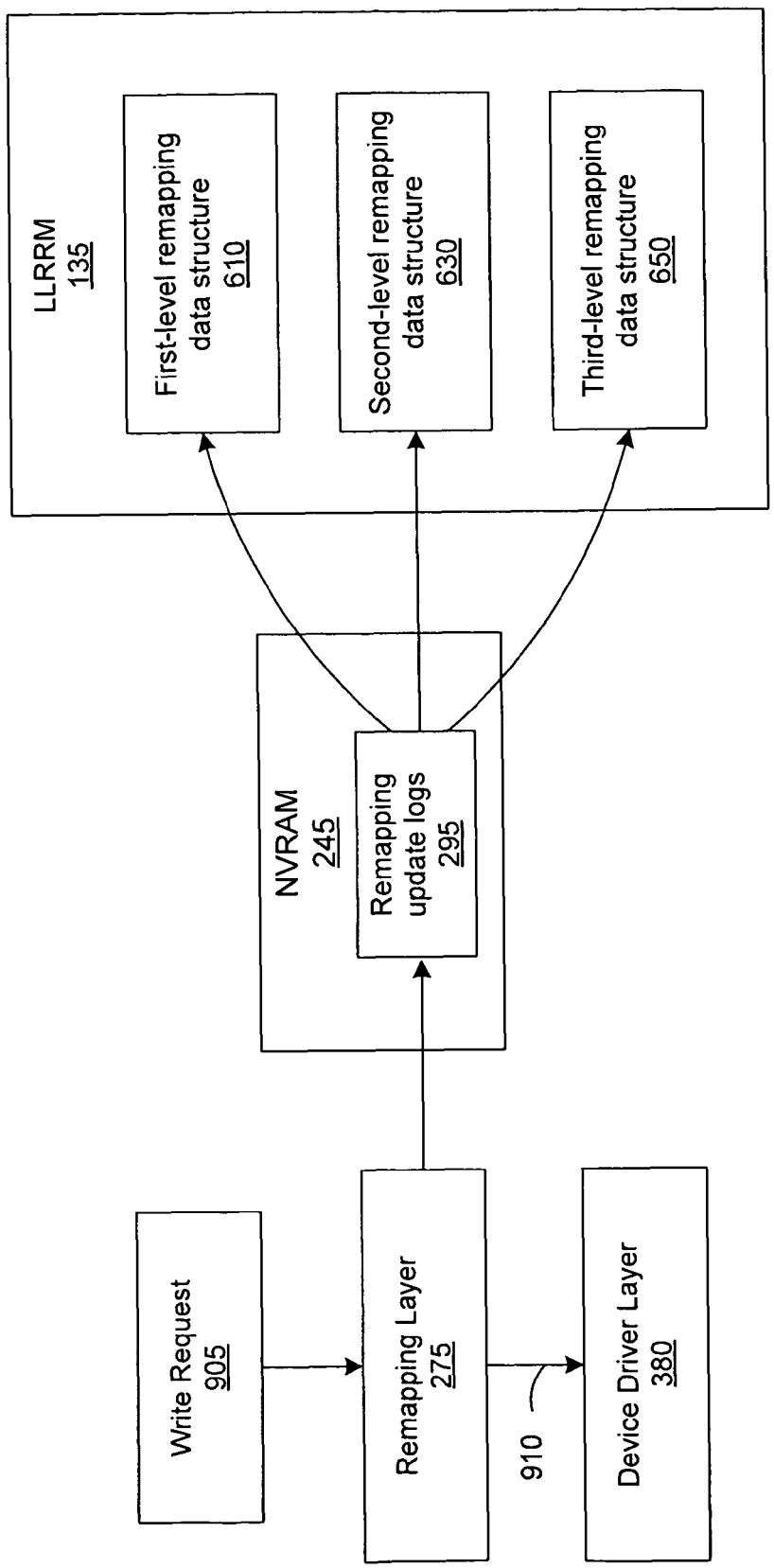
FIG. 9 shows a conceptual diagram of the processing of received write requests by the remapping layer.

FIG. 9 shows a conceptual diagram of the processing of received write requests by the remapping layer 275. In general, for a received write request 905, the remapping layer 275 may receive as input (from the storage layer 370) a storage system address and data to be written at the storage system address, store the received data to an LLRRM address in an LLRRM device 135, and update the remapping data structures to reflect the storing of the received data to the LLRRM address.

In particular, when write requests 905 having new data are received, the storage operating system may assign a new storage system address where the new data is to be stored, and send the assigned storage system address to the remapping layer 275. The remapping layer 275 receives the new storage system address and new data and stores the new data to an LLRRM address in an LLRRM device 135 (rather than at the new storage system address). As such, for the received storage system address, the remapping layer 275 may assign/associate a new LLRRM address where the new data is stored on an LLRRM device 135. To execute the write request 905 at the assigned LLRRM address, the remapping layer 275 may then send a write command 910 to the device driver layer 380, the write command 910 specifying a write operation at the assigned LLRRM address.

In some embodiments, as discussed above in relation to FIG. 5, the remapping layer 275 may store new data to the LLRRM device 135 using a log-based storage scheme, whereby new data is written in chronological order to the next available page 520 in the LLRRM device 135. In other embodiments, data is written to the LLRRM device 135 using a different storage scheme other than log-based. In some embodiments, the remapping layer 275 only stores data to predetermined "data" segments on the LLRRM device 135. In these embodiments, the LLRRM device 135 is divided into data segments and remapping segments, whereby the pages of a data segment are used to store only data and the pages of a remapping segment store only metadata such as remapping data structures. The segment header of each segment may contain segment-type metadata 550 (as shown in FIG. 5) indicating whether the segment is a data (D) segment or a remapping (R) segment.

Storing new data (from new write requests 905) on the LLRRM device 135 produces new remappings between the received storage system addresses and the LLRRM addresses where the new data is stored on the LLRRM device 135. As such, the remapping data structures may need to be updated to reflect the new remappings. For example, a single new remapping produced by a single received write request 905 may require a change in one or more entries 655 in the third-level remapping data structure 650, which in turn may require a change in one or more entries 635 in the second-level remapping data structure 630, which in turn may require a change in one or more entries 615 in the first-level remapping data structure 610. In some embodiments, for each new remapping that is produced, the remapping layer 275 may determine updates/changes that need to be made to one or more remapping data structures and produce one or more remapping update logs 295 that specify these changes/updates to be made to the one or more remapping data structures (to reflect the new remapping).

In these embodiments, when changes are needed to be made to the remapping data structures, the remapping layer 275 may update the remapping data structures in two stages. In a first stage, the remapping layer 275 produces one or more remapping update logs for each new address remapping. Each remapping update log may contain information specifying changes to be made to a specific remapping data structures to reflect the new address remapping. For example, a remapping update log may specify one or more values to be changed in an LBN range or number and/or a segment or page number in a particular remapping data structure. In some embodiments, the remapping update logs 295 may be stored in NVRAM 245 (as shown in FIG. 2) or other non-volatile storage device.

In a second stage, the stored and accumulated remapping update logs 295 (e.g., stored in the NVRAM 245) are then performed by the remapping layer 275 to update the remapping data structures (which are stored in an LLRRM device 135). The second stage may be triggered by various predetermined events (e.g., the active segment becoming finalized or a consistency point), whereupon the accumulated update logs 295 are performed on the remapping data structures. Any remapping update logs 295 performed upon trigger of the second stage may then be deleted from the NVRAM 245.

For example, the second stage may be triggered by an active segment becoming "finalized" (i.e., after new data is written to the last available page of the active segment). As discussed above in relation to FIG. 5, there is typically only one segment (the "active segment") in an LLRRM device 135 that is being written to at any one time. New remappings are produced as new data is written to pages in the active segment, and the remapping layer 275 may produce and store remapping update logs 295 for the new remappings. Each remapping update log may specify an update to be made to the active segment header (which comprises a third-level remapping data structure 650). After the active segment is finalized, the second stage may be triggered upon which the accumulated update logs 295 are performed (whereby updates are made to the active segment header). In some embodiments, each segment header of a segment may contain a timestamp (TS) or a version number (VN) 560 (as shown in FIG. 5) that is updated after the segment is finalized (as discussed further below).

As a further example, the second stage may be triggered at predetermined time intervals (referred to as consistency points). In addition to the remapping update logs 295 produced for a third-level remapping data structure 650 (the active segment header), the remapping layer 275 may also produce remapping update logs 295 for the first-level or second-level remapping data structures 610 and 630. In these embodiments, the second stage may be triggered by the occurrence of a consistency point so that accumulated remapping update logs 295 for the first-level or second-level remapping data structures 610 and 630 are performed regularly at predetermined time intervals.

Embodiments described herein may be applied to a remapping layer 275 that performs or does not perform updates to the remapping data structures in two stages. In other embodiments, the remapping layer 275 may perform updates to the remapping data structures in a single stage as new remappings are produced. However, when the remapping layer 275 performs updates to the remapping data structures in two stages, consistency of the updates to the remapping data structures may be enhanced as the remapping update logs 295 are stored to NVRAM 245 or to another non-volatile storage device. As such, needed updates to the remapping data structures (reflected by the remapping update logs 295) are preserved in NVRAM 245 in case of a storage system "crash." After restart/reboot of the storage system, the remapping layer 275 may be configured to check the NVRAM 245 to determine if any remaining remapping update logs 295 are stored in the NVRAM 245. If so, the remapping layer 275 may perform the remaining remapping update logs 295 to ensure consistency of remapping data structures.

Figure 10:
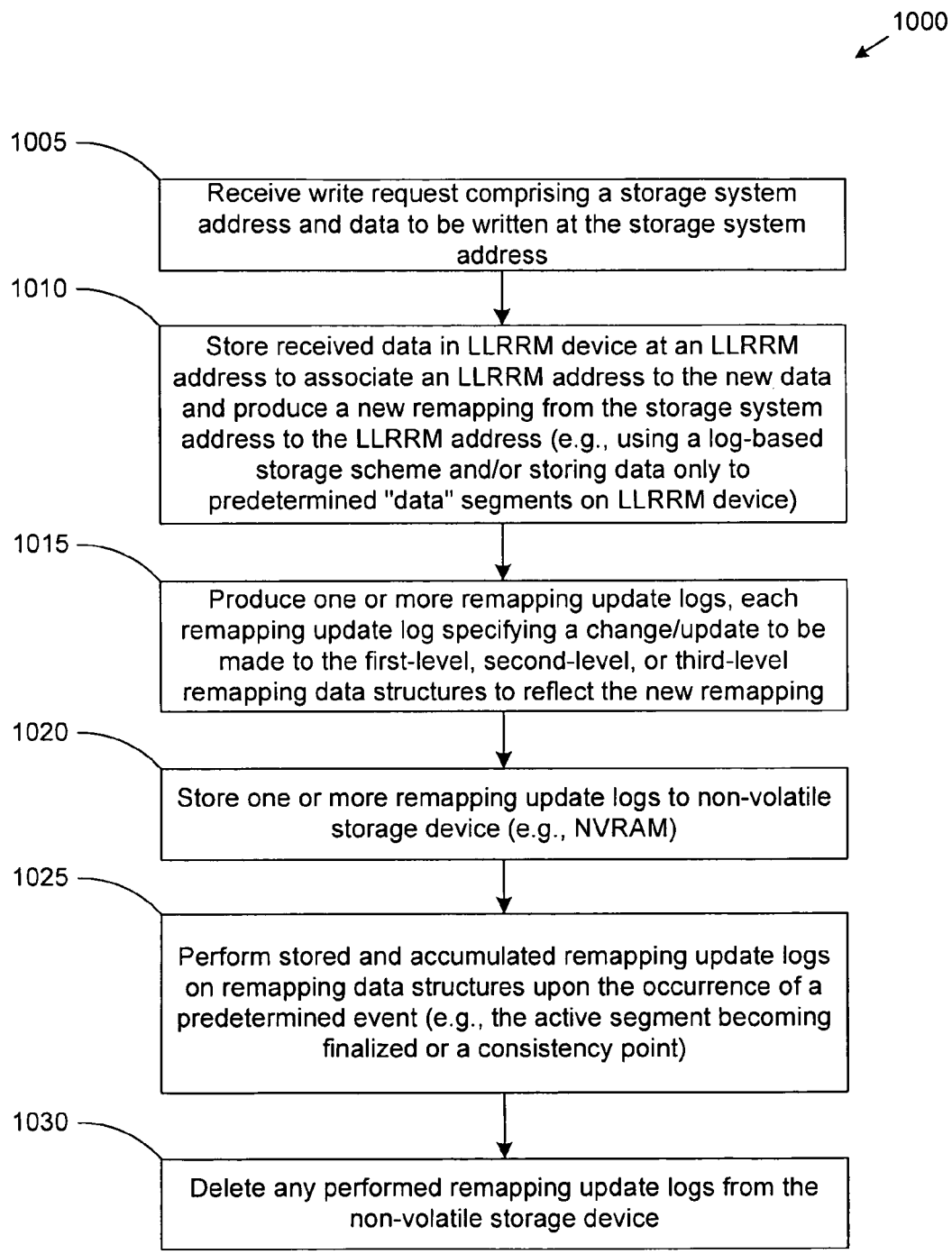
FIG. 10 is a flowchart of a method for processing write requests and updating the remapping data structures based on the write requests.

FIG. 10 is a flowchart of a method 1000 for processing write requests and updating the remapping data structures based on the write requests. In some embodiments, some of the steps of the method 1000 are implemented by software or hardware. In some embodiments, some of the steps of method 1000 are performed by the remapping layer 275 in conjunction with the device driver layer 380. The order and number of steps of the method 1000 are for illustrative purposes only and, in other embodiments, a different order and/or number of steps are used.

The method 1000 begins when a write request 905 is received (at step 1005), the write request comprising a storage system address and data to be written at the storage system address. The method then stores (at step 1010) the received data in an active segment in the LLRRM device 135 at an LLRRM address, thus assigning/associating an LLRRM address to the new data and producing a new remapping (from the received storage system address to the LLRRM address). In some embodiments, the method 1000 stores data to the LLRRM device 135 using a log-based storage scheme. In some embodiments, the method stores data only to predetermined "data" segments on the LLRRM device 135.

For the new remapping, the method 1000 then produces (at step 1015) one or more remapping update logs 295, each remapping update log specifying a change/update to be made to the first-level, second-level, or third-level remapping data structures to reflect the new remapping. In some embodiments, a remapping update log may specify one or more values to be changed in an LBN range or number and/or a segment or page number in a particular remapping data structure. The method 1000 then stores (at step 1020) the one or more produced remapping update logs 295 to NVRAM 245 (as shown in FIG. 2) or other non-volatile storage device.

The method 1000 then performs (at step 1025) stored and accumulated remapping update logs 295 (e.g., stored in the NVRAM 245) on the remapping data structures upon the occurrence of a predetermined event (e.g., the active segment becoming finalized or a consistency point). The method 1000 then deletes (at step 1030) any performed remapping update logs 295 from the NVRAM 245. The method 1000 may be repeated for each received write request 905.

V. Recovering or Reconstructing the Remapping Data Structures

In some embodiments, methods may be implemented to enhance recoverability or reconstruction of the remapping data structures in case of a restart of the storage system after a shut-down (whether intentional or not). These methods may be used to avoid performing a full scan of all the segments and pages of the LLRRM device 135 to rebuild the remapping data structures and provides a faster restart of the storage system. A full scan of a typical small-capacity LLRRM device 135 may be performed in an acceptable amount of time, but a full scan of a large-capacity LLRRM device 135 may require a substantial amount of time.

A. Recovering the Remapping Data Structures

As discussed above, the remapping data structures may be stored in a non-volatile LLRRM device 135 so that the remapping data structures may be retained upon a storage system shut-down. In these embodiments, the first-level remapping data structure 610 may be stored at a predetermined address on an LLRRM device 135. In other embodiments, a pointer or reference to the address location of the first-level remapping data structure 610 may be stored at the predetermined address on an LLRRM device 135. Upon start-up of the store operating system, the remapping layer 275 may be configured to locate and use the first-level remapping data structure 610 at the predetermined address (or locate the first-level remapping data structure 610 using the pointer at the predetermined address).

As discussed above, recent updates to the remapping data structures may be reflected in remapping update logs 295 that are stored in a non-volatile memory (e.g., NVRAM 245). The stored remapping update logs 295 are performed on the remapping data structures upon the occurrence of a predetermined event (e.g., the active segment becoming finalized or a consistency point). Any performed remapping update logs 295 may then be deleted from the non-volatile memory. As such, in general, the remapping data structures (stored in the LLRRM device 135) will be up-to-date except for the remapping update logs 295 remaining in the non-volatile memory. Thus, upon start-up of the storage operating system, the remapping layer 275 may also be configured to perform any remaining remapping update logs 295 stored in the LLRRM device 135 so that the remapping data structures are up-to-date.

Once the first-level remapping data structure 610 is located and updated, the remapping layer 275 may begin using and updating the remapping data structures as described herein. Note that only the first-level remapping data structure 610 may need to be located since the first-level remapping data structure 610 will contain locations for the second-level remapping data structure 630 and the second-level remapping data structure 630 will contain locations for the third-level remapping data structure 650. The remapping layer 275 may also load/cache some or all of the first-level, second-level, and/or third-level remapping data structure to memory 240.

Figure 11:
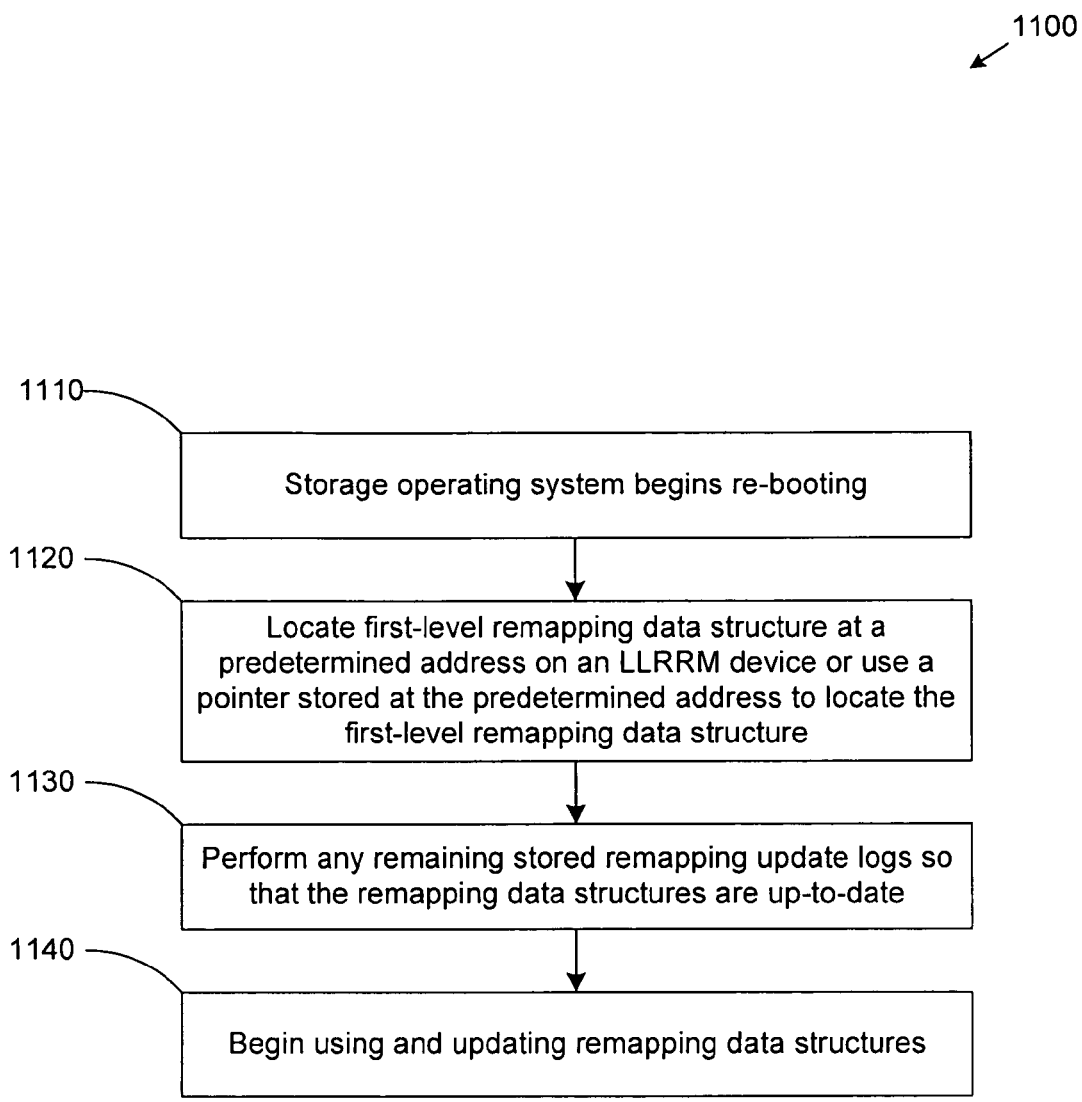
FIG. 11 is a flowchart of a method for recovering the remapping data structures upon a restart of the storage system.

FIG. 11 is a flowchart of a method 1100 for recovering the remapping data structures upon a restart of the storage system. In some embodiments, some of the steps of the method 1100 are implemented by software or hardware. In some embodiments, some of the steps of method 1100 are performed by the remapping layer 275 of the storage operating system 300. The order and number of steps of the method 1100 are for illustrative purposes only and, in other embodiments, a different order and/or number of steps are used.

The method 1100 begins when the storage operating system 300 begins re-booting/restarting (at step 1110). The method then locates (at step 1120) the first-level remapping data structure 610 at a predetermined address on an LLRRM device 135 or uses a pointer stored at the predetermined address to locate the first-level remapping data structure 610. The method then performs (at 1130) any remaining remapping update logs 295 stored in non-volatile memory (e.g., NVRAM 245) so that the remapping data structures are up-to-date. The method then begins using and updating (at 1140) the remapping data structures as described herein. The method 1100 then ends.

B. Reconstructing the First-Level Remapping Data Structure

In some embodiments, methods may be implemented to enhance reconstruction of the remapping data structures in case the first-level remapping data structure 610 and/or second-level remapping data structures 630 are lost or become corrupted. In such situations, the first-level remapping data structure 610 and/or second-level remapping data structure 630 may need to be reconstructed.

If the first-level remapping data structure 610 is lost or corrupted, the first-level remapping data structure 610 may be reconstructed by locating the second-level remapping data structures 630 and using the second-level remapping data structures 630 to reconstruct the entries 615 of the first-level remapping data structure 610. In some embodiments, to reduce the time needed to locate the second-level remapping data structures 630, the second-level remapping data structures may be stored only to a set of one or more predetermined "remapping" segments in the LLRRM device 135.

In these embodiments, the LLRRM device 135 is divided into data and remapping segments. The pages (not including the segment header) of a data segment may be used to store only data, and are not used to store remapping data structures. The pages of a remapping segment may store only first-level and/or second-level remapping data structures. The remapping segments may comprise contiguous segments (e.g., segments 0, 1, and 2) or non-contiguous segments (e.g., segments 0, 8, and 22) in the LLRRM device 135. The remapping layer 275 may be configured to store the first-level and second-level remapping data structures only to the set of predetermined remapping segments in the LLRRM device 135.

In these embodiments, the segment header of each segment may contain segment-type metadata 550 (as shown in FIG. 5) indicating whether the segment is a data (D) or remapping (R) segment. The remapping layer 275 may analyze/scan each segment header to determine whether a segment is a remapping or data segment. The remapping layer 275 may then further analyze/scan the pages of only remapping segments to locate the second-level remapping data structures 630 stored in the pages of the remapping segments. The remapping layer 275 may omit/avoid further scanning of the pages of the data segments. As such, the time needed to locate the second-level remapping data structures 630 may be reduced since only remapping segments are further scanned (compared to performing a complete scan of all segments in the LLRRM device 135).

After the second-level remapping data structures 630 are located (by scanning the remapping segments), the remapping layer 275 may then reconstruct the entries 615 of the first-level remapping data structure 610 using the second-level remapping data structures 630. The remapping layer 275 may then perform any remapping update logs 295 remaining in the LLRRM device 135 so that the remapping data structures are up-to-date.

Figure 12:
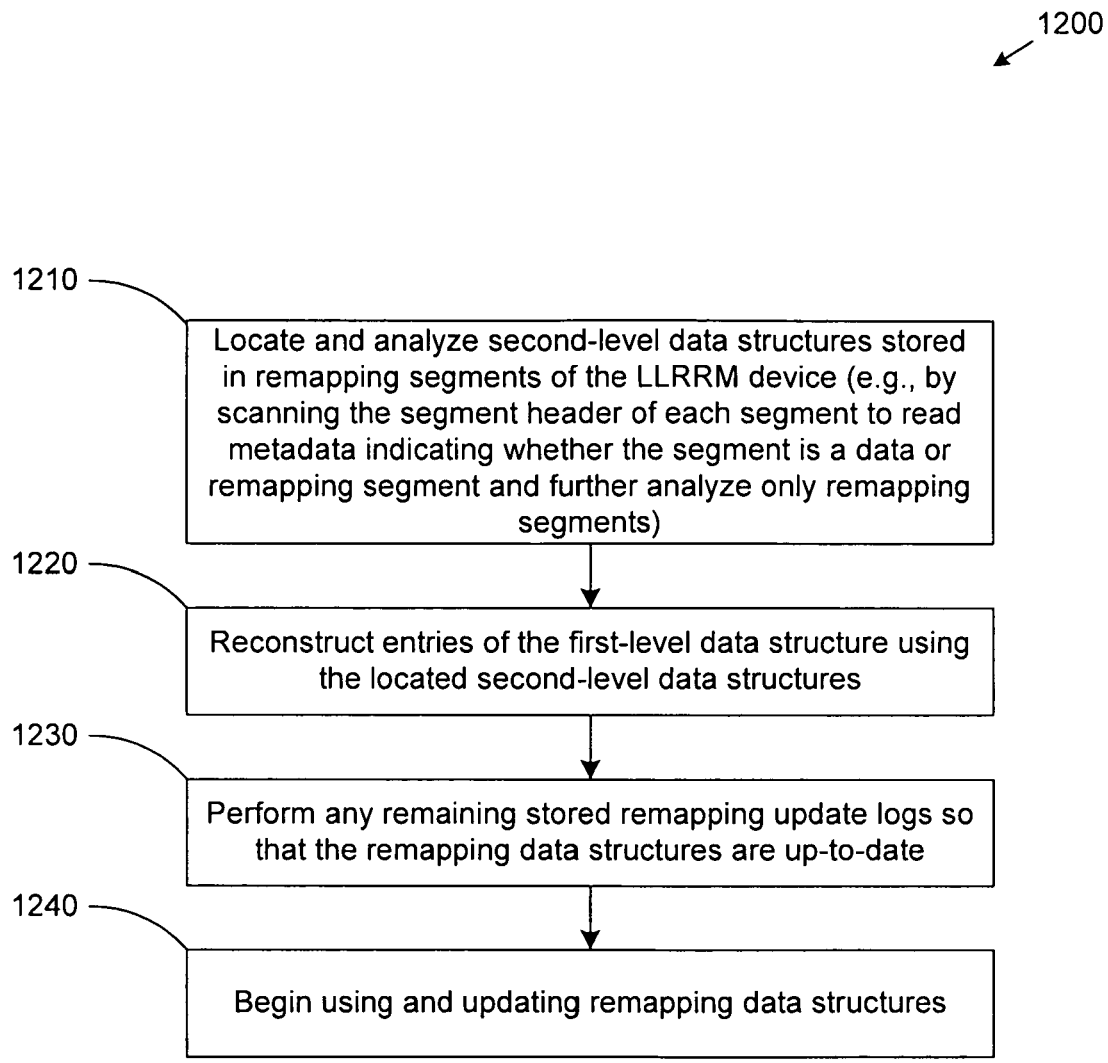
FIG. 12 is a flowchart of a method for reconstructing the first-level remapping data structure upon loss or corruption of the first-level remapping data structure.

FIG. 12 is a flowchart of a method 1200 for reconstructing the first-level remapping data structure 610 upon loss or corruption of the first-level remapping data structure 610. In some embodiments, some of the steps of the method 1200 are implemented by software or hardware. In some embodiments, some of the steps of method 1200 are performed by the remapping layer 275 of the storage operating system 300. The order and number of steps of the method 1200 are for illustrative purposes only and, in other embodiments, a different order and/or number of steps are used.

The method 1200 begins by locating and analyzing (at step 1210) the second-level remapping data structures 630 stored in the remapping segments of the LLRRM device 135. The method 1200 may do so by scanning the segment header of each segment to read metadata 550 indicating whether the segment is a data or remapping segment, and then further analyze only remapping segments to locate the second-level remapping data structures 630. The method 1200 then reconstructs (at step 1220) the entries 615 of the first-level remapping data structure 610 using the located second-level remapping data structures 630. The method then performs (at 1230) any remaining stored remapping update logs 295 (e.g., stored in NVRAM 245) so that the remapping data structures are up-to-date. The method begins using and updating (at 1240) the remapping data structures as described herein. The method 1200 then ends.

C. Reconstructing the First-Level and Second-Level Remapping Data Structures

If both the first-level remapping data structure 610 and the second-level remapping data structures 630 are lost or corrupted, the second-level remapping data structures 630 may be reconstructed by locating the third-level remapping data structures 650 and using the third-level remapping data structures 650 to reconstruct the entries 635 of the second-level remapping data structures 630. The third-level remapping data structures 650 may comprise segment headers. In some embodiments, each segment header of a segment may contain a timestamp (TS) or a version number (VN) 560 (as shown in FIG. 5) that may be updated whenever new data is written to the pages of the segment. For example, after an active segment is finalized and new data is written to the last available page of an active segment, an updated timestamp (reflecting the time the active segment was last finalized) or updated version number may be written to the segment header of the active segment. In some embodiments, the version number may be a monotonically increasing version number that increases at every update of the version number.

As discussed above, as new data having assigned storage system addresses are written to LLRRM addresses, new remappings between storage system addresses and LLRRM addresses are produced. For example, a first storage system address may have previously mapped to a first LLRRM address in a first segment, whereby a new remapping may cause the first storage system address to now map to a second, different LLRRM address in a second segment. The segment header for the first segment will contain a mapping from the first storage system address to the first LLRRM address and the segment header for the second segment will contain a mapping from the first storage system address to the second LLRRM address. As such, two segment headers/third-level remapping data structures 650 may contain remapping data for the same storage system address.

In some embodiments, the remapping layer 275 may use the timestamps or version numbers stored in the segment headers/third-level remapping data structures 650 when reconstructing the entries 635 of the second-level remapping data structures 630. In these embodiments, the remapping layer 275 may examine the timestamps or version numbers of two segment headers/third-level remapping data structures 650 that each contain remapping data for the same storage system address. The remapping layer 275 then determines which segment header has the most up-to-date remapping data and uses the up-to-date remapping data for reconstructing the second-level remapping data structures 630. After the second-level remapping data structures 630 are reconstructed, the remapping layer 275 may then reconstruct the entries 615 of the first-level remapping data structure 610 using the second-level remapping data structures 630.

Figure 13:
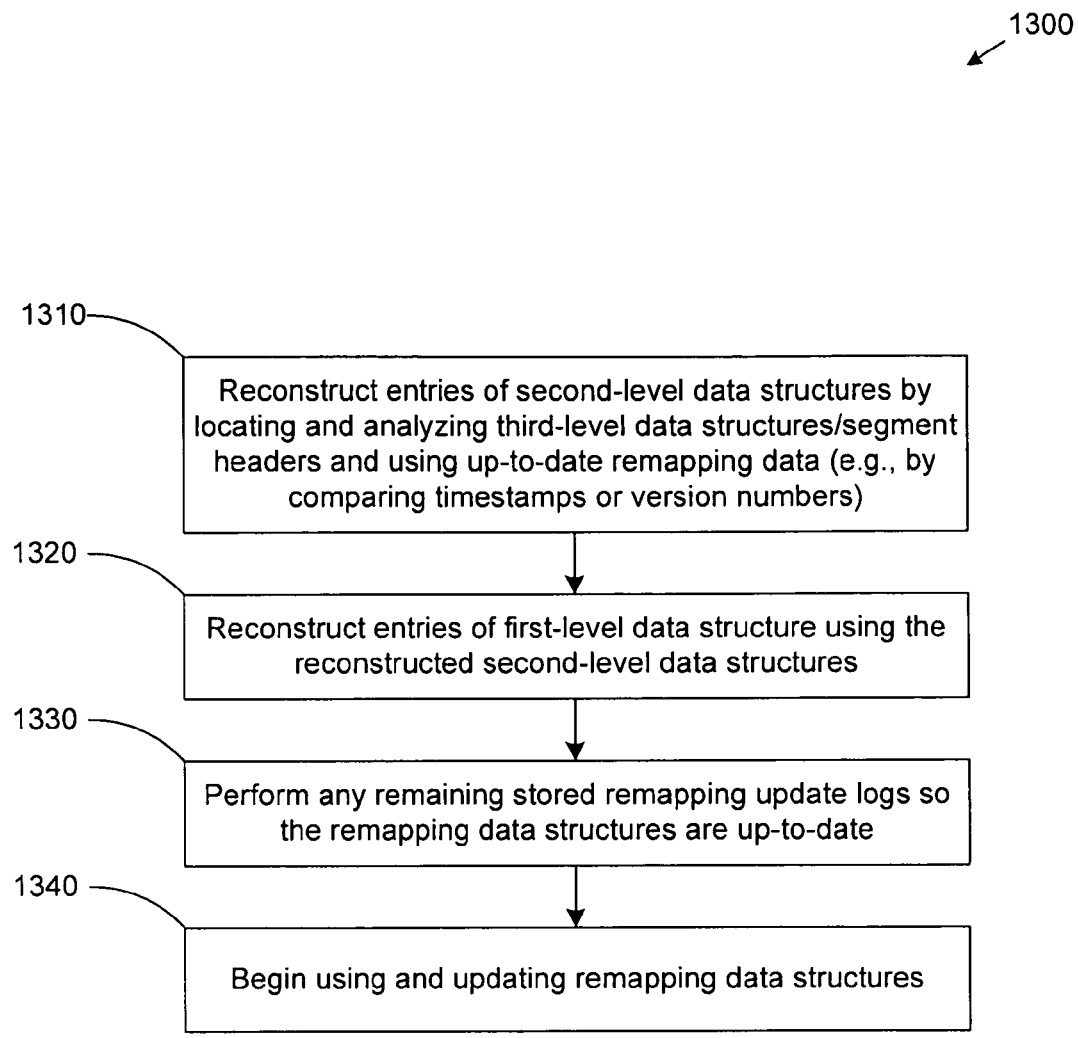
FIG. 13 is a flowchart of a method for reconstructing the first-level and second-level remapping data structures upon loss or corruption of these remapping data structures.

FIG. 13 is a flowchart of a method 1300 for reconstructing the first-level and second-level remapping data structures upon loss or corruption of these remapping data structures. In some embodiments, some of the steps of the method 1300 are implemented by software or hardware. In some embodiments, some of the steps of method 1300 are performed by the remapping layer 275 of the storage operating system 300. The order and number of steps of the method 1300 are for illustrative purposes only and, in other embodiments, a different order and/or number of steps are used.

The method 1300 begins by reconstructing (at step 1310) the entries 635 of the second-level remapping data structures 630 by locating and analyzing the third-level remapping data structures 650/segment headers and using up-to-date remapping data (regarding remappings from storage system addresses to LLRRM addresses) in the third-level remapping data structures 650/segment headers. The method 1300 may do so by comparing timestamps (TS) or version numbers (VN) 560 stored in two segment headers having remapping data for the same storage system address to determine the up-to-date remapping data. The method 1300 then reconstructs (at step 1320) the entries 615 of the first-level remapping data structure 610 using the reconstructed second-level remapping data structures 630. The method then performs (at 1330) any remaining stored remapping update logs 295 (e.g., stored in NVRAM 245) so that the remapping data structures are up-to-date. The method begins using and updating (at 1340) the remapping data structures as described herein. The method 1300 then ends.

Some embodiments may be conveniently implemented using a conventional general purpose or a specialized digital computer or microprocessor programmed according to the teachings of the present disclosure, as will be apparent to those skilled in the computer art. Appropriate software coding may readily be prepared by skilled programmers based on the teachings of the present disclosure, as will be apparent to those skilled in the software art. Some embodiments may also be implemented by the preparation of application-specific integrated circuits or by interconnecting an appropriate network of conventional component circuits, as will be readily apparent to those skilled in the art.

Some embodiments include a computer program product which is a storage medium (media) having instructions stored thereon/in which may be used to control, or cause, a computer to perform any of the processes of an embodiment. The storage medium may include without limitation any type of disk including floppy disks, mini disks (MD's), optical disks, DVDs, CD-ROMs, micro-drives, and magneto-optical disks, ROMs, RAMs, EPROMs, EEPROMs, DRAMs, VRAMs, flash memory devices (including flash cards), magnetic or optical cards, nanosystems (including molecular memory ICs), RAID devices, remote data storage/archive/warehousing, or any type of media or device suitable for storing instructions and/or data.

Stored on any one of the computer readable medium (media), some embodiments include software for controlling both the hardware of the general purpose/specialized computer or microprocessor, and for enabling the computer or microprocessor to interact with a human user or other mechanism utilizing the results of an embodiment. Such software may include without limitation device drivers, operating systems, and user applications. Ultimately, such computer readable media further includes software for performing some embodiments, as described above. Included in the programming (software) of the general/specialized computer or microprocessor are software modules for implementing the teachings of some embodiments.

While the embodiments described herein have been described with reference to numerous specific details, one of ordinary skill in the art will recognize that the embodiments can be embodied in other specific forms without departing from the spirit of the embodiments. Thus, one of ordinary skill in the art would understand that the embodiments described herein are not to be limited by the foregoing illustrative details, but rather are to be defined by the appended claims.

We claim:

1. A storage system for storing data blocks, each data block having an unique storage system address, the storage system comprising:
   at least one low-latency random read memory (LLRRM) device for storing data, the LLRRM device comprising a plurality of segments, each segment comprising a plurality of pages for storing data, each page having an LLRRM address that uniquely identifies the location of the page in the LLRRM device;
   a first-level remapping data structure, a plurality of second-level remapping data structures associated with the first-level remapping data structure, and a plurality of third-level remapping data structures associated with each second-level remapping data structure; and
   a storage operating system configured for:
      receiving a read request comprising a storage system address;
      remapping the storage system address to an LLRRM address by using the first-level remapping data structure to locate a selected second-level remapping data structure corresponding to the storage system address, the selected second-level remapping data structure being selected from the plurality of second-level remapping data structures associated with the first-level remapping data structure, and using the selected second-level remapping data structure to locate a selected third-level remapping data structure corresponding to the storage system address, the selected third-level remapping data structure being selected from the plurality of third-level remapping data structures associated with the selected second-level remapping data structure, the LLRRM address comprising a segment number determined from the selected second-level remapping data structure and a page number determined from the selected third-level remapping data structure.

2. The storage system of claim 1, wherein the LLRRM device comprises a non-volatile, rewritable solid state memory having lower latency in performing random read requests relative to disk devices.

3. The storage system of claim 1, wherein:
   the first-level remapping data structure comprises a plurality of entries, each entry comprising a storage system address range field and a second-level locater field for locating a second-level remapping data structure corresponding to the storage system address range;
   each second-level remapping data structure comprises a plurality of entries, each entry comprising a storage system address range field and a third-level locater field for locating a third-level remapping data structure corresponding to the storage system address range; and
   each third-level remapping data structure comprises a plurality of entries, each entry comprising a storage system address field and a page number field.

4. The storage system of claim 3, wherein:
   each segment further comprises a segment header for storing metadata, a segment header comprising a third-level remapping data structure;
   a third-level locater field comprises a segment number for locating a segment header comprising a third-level remapping data structure; and
   the LLRRM address comprises the segment number from the third-level locater field and the page number from the page number field.

5. A method for using a low-latency random read memory (LLRRM) device for storing data in a storage system, the storage system for storing data blocks, each data block having an unique storage system address, the LLRRM device comprising a plurality of segments, each segment comprising a plurality of pages for storing data, each page having an LLRRM address that uniquely identifies the location of the page in the LLRRM device, the method comprising:
   storing a first-level remapping data structure, a plurality of second-level remapping data structures associated with the first-level remapping data structure, and a plurality of third-level remapping data structures associated with each second-level remapping data structure;
   receiving a storage system address from a read request; and
   remapping the storage system address to an LLRRM address by using the first-level remapping data structure to locate a selected second-level remapping data structure corresponding to the storage system address, the selected second-level remapping data structure being selected from the plurality of second-level remapping data structures associated with the first-level remapping data structure, and using the selected second-level remapping data structure to locate a selected third-level remapping data structure corresponding to the storage system address, the selected third-level remapping data structure being selected from the plurality of third-level remapping data structures associated with the selected second-level remapping data structure, the LLRRM address comprising a segment number determined from the selected second-level remapping data structure and a page number determined from the selected third-level remapping data structure.

6. The method of claim 5, wherein the LLRRM device comprises a non-volatile, rewritable solid state memory having lower latency in performing random read requests relative to disk devices.

7. The method of claim 5, wherein:
   the first-level remapping data structure comprises a plurality of entries, each entry comprising a storage system address range field and a second-level locater field for locating a second-level remapping data structure corresponding to the storage system address range;
   each second-level remapping data structure comprises a plurality of entries, each entry comprising a storage system address range field and a third-level locater field for locating a third-level remapping data structure corresponding to the storage system address range; and
   each third-level remapping data structure comprises a plurality of entries, each entry comprising a storage system address field and a page number field.

8. The method of claim 7, wherein remapping the storage system address to an LLRRM address comprises:
   determining a first matching entry in the first-level remapping data structure having a storage system address range field containing the received storage system address;

using the second-level locator field in the first matching entry to locate the second-level remapping data structure corresponding to the received storage system address;

determining a second matching entry in the second-level remapping data structure having a storage system address range field containing the received storage system address;

using the third-level locator field in the second matching entry to locate the third-level remapping data structure corresponding to the received storage system address;

determining a third matching entry in the third-level remapping data structure having a storage system address field matching the received storage system address; and determining the page number field in the third matching entry.

9. The method of claim 8, wherein:

each segment further comprises a segment header for storing remapping metadata, a segment header comprising a third-level remapping data structure;

a third-level locater field comprises a segment number for locating a segment header comprising a third-level remapping data structure; and the LLRRM address comprises the segment number from the third-level locater field and the page number from the page number field.

10. A storage system for storing data blocks, each data block having an unique storage system address, the storage system comprising:

at least one low-latency random write memory (LLRRM) device for storing data, the LLRRM device comprising a plurality of segments, each segment comprising a plurality of pages for storing data, each page having an LLRRM address that uniquely identifies the location of the page in the LLRRM device;

a first-level remapping data structure, a plurality of second-level remapping data structures associated with the first-level remapping data structure, and a plurality of third-level remapping data structures associated with each second-level remapping data structure; and a storage operating system configured for:

receiving a write request comprising a storage system address and data;

storing the received data to an LLRRM address in the LLRRM device to produce a remapping from the received storage system address to the LLRRM address where the received data is stored, the remapping comprising using the first-level remapping data structure to locate a selected second-level remapping data structure corresponding to the storage system address, the selected second-level remapping data structure being selected from the plurality of second-level remapping data structures associated with the first-level remapping data structure, and using the selected second-level remapping data structure to locate a selected third-level remapping data structure corresponding to the storage system address, the selected third-level remapping data structure being selected from the plurality of third-level remapping data structures associated with the selected second-level remapping data structure, the LLRRM address comprising a segment number determined from the selected second-level remapping data structure and a page number determined from the selected third-level remapping data structure;

producing and storing one or more remapping update logs, each remapping update log specifying a change to be made to a particular remapping data structure to reflect the remapping; and performing the stored remapping update logs on the remapping data structures upon the occurrence of a predetermined event.

11. The storage system of claim 10, wherein the LLRRM device comprises a non-volatile, rewritable solid state memory having lower latency in performing random write requests relative to disk devices.

12. The storage system of claim 10, wherein:

the storage system further comprises a non-volatile storage device for storing the remapping update logs; and the storage operating system is further configured for deleting any performed remapping update logs from the non-volatile storage device.

13. The storage system of claim 10, wherein:

the data is stored to an active segment which is finalized when data is written to a last page of the active segment; and the predetermined event comprises an active segment becoming finalized or an occurrence of a predetermined time interval.

14. The storage system of claim 10, wherein:

the storage system further comprises a non-volatile storage device for storing at least one remapping data structure; and the storage operating system is further configured for:

upon restart of the storage system, locating the at least one remapping data structure at a predetermined address on the non-volatile storage device or using a pointer stored at the predetermined address to locate the at least one remapping data structure; and using the at least one remapping data structure to locate other remapping data structures.

15. The storage system of claim 10, wherein:

the LLRRM device comprises data segments for storing data and remapping segments for storing remapping data structures;

each segment of the LLRRM device further comprises a segment header having metadata indicating whether the segment is a data segment or a remapping segment; and the storage operating system is further configured for, upon restart of the storage system, reconstructing the remapping data structures by:

scanning the segment header of each segment to determine whether the segment is a data segment or a remapping segment; and further scanning the pages of only the remapping segments for remapping data structures and not further scanning the pages of the data segments for remapping data structures.

16. The storage system of claim 10, wherein:

each segment of the LLRRM device further comprises a segment header comprising remapping data for remappings of storage system addresses to LLRRM addresses and a timestamp or a version number that is updated whenever new data is written to the pages of the segment;

the storage operating system is further configured for, upon restart of the storage system:

scanning two segment headers having remapping data for a same storage system address;

determining which segment header contains the more current remapping data using the timestamp or a version number; and using the more current remapping data for reconstructing a remapping data structure.

17. A method for using a low-latency random read memory (LLRRM) device for storing data in a storage system, the storage system for storing data blocks, each data block having an unique storage system address, the LLRRM device comprising a plurality of segments, each segment comprising a plurality of pages for storing data, each page having an LLRRM address that uniquely identifies the location of the page in the LLRRM device, the method comprising:
  storing a first-level remapping data structure, a plurality of second-level remapping data structures associated with the first-level remapping data structure, and a plurality of third-level remapping data structures associated with each second-level remapping data structure;
  receiving a write request comprising a storage system address and data;
  storing the received data to an LLRRM address in the LLRRM device to produce a remapping from the received storage system address to the LLRRM address where the received data is stored, the remapping comprising using the first-level remapping data structure to locate a selected second-level remapping data structure corresponding to the storage system address, the selected second-level remapping data structure being selected from the plurality of second-level remapping data structures associated with the first-level remapping data structure, and using the selected second-level remapping data structure to locate a selected third-level remapping data structure corresponding to the storage system address, the selected third-level remapping data structure being selected from the plurality of third-level remapping data structures associated with the selected second-level remapping data structure, the LLRRM address comprising a segment number determined from the selected second-level remapping data structure and a page number determined from the selected third-level remapping data structure;
  producing and storing one or more remapping update logs, each remapping update log specifying a change to be made to a particular remapping data structure to reflect the remapping; and
  performing the stored remapping update logs on the remapping data structures upon the occurrence of a predetermined event.

18. The method of claim 17, wherein the LLRRM device comprises a non-volatile, rewritable solid state memory having lower latency in performing random write requests relative to disk devices.

19. The method of claim 17, wherein:
  the data is stored to an active segment which is finalized when data is written to a last page of the active segment; and
  the predetermined event comprises an active segment becoming finalized or an occurrence of a predetermined time interval.

20. The method of claim 17, wherein at least one remapping data structure is stored to a non-volatile storage device, the method further comprising:
  upon restart of the storage system, locating the at least one remapping data structure at a predetermined address on the non-volatile storage device or using a pointer stored at the predetermined address to locate the at least one remapping data structure; and
  using the at least one remapping data structure to locate other remapping data structures.

21. The method of claim 17, wherein the LLRRM device comprises data segments for storing data and remapping segments for storing remapping data structures, and each segment of the LLRRM device further comprises a segment header having metadata indicating whether the segment is a data segment or a remapping segment, the method further comprising:
  upon restart of the storage system, reconstructing the remapping data structures by:
    scanning the segment header of each segment to determine whether the segment is a data segment or a remapping segment; and
    further scanning the pages of only the remapping segments for remapping data structures and not further scanning the pages of the data segments for remapping data structures.

22. The method of claim 17, wherein each segment of the LLRRM device further comprises a segment header comprising remapping data for remappings of storage system addresses to LLRRM addresses and a timestamp or a version number that is updated whenever new data is written to the pages of the segment, the method further comprising:
  upon restart of the storage system:
    scanning two segment headers having remapping data for a same storage system address;
    determining which segment header contains the more current remapping data using the timestamp or a version number; and
    using the more current remapping data for reconstructing a remapping data structure.

* * * * *